(12) United States Patent
Moser et al.

(10) Patent No.: US 9,771,141 B2
(45) Date of Patent: Sep. 26, 2017

(54) LEADING EDGE SYSTEM AND METHOD FOR APPROACH NOISE REDUCTION

(71) Applicant: The Boeing Company, Chicago, IL (US)

(72) Inventors: Matthew A. Moser, Marysville, WA (US); Michael R. Finn, Kirkland, WA (US); Duk Park, Bothell, WA (US); Christopher A. Konings, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 48 days.

(21) Appl. No.: 14/035,011

(22) Filed: Sep. 24, 2013

(65) Prior Publication Data

US 2015/0083855 A1   Mar. 26, 2015

(51) Int. Cl.
| | |
|---|---|
| *B64C 9/16* | (2006.01) |
| *B64C 9/20* | (2006.01) |
| *B64C 9/22* | (2006.01) |
| *B64C 9/24* | (2006.01) |
| *B64C 13/28* | (2006.01) |

(52) U.S. Cl.
CPC ................ *B64C 9/16* (2013.01); *B64C 9/20* (2013.01); *B64C 9/22* (2013.01); *B64C 9/24* (2013.01); *B64C 13/28* (2013.01); *Y02T 50/32* (2013.01); *Y02T 50/44* (2013.01)

(58) Field of Classification Search
CPC .... B64C 9/16; B64C 9/20; B64C 9/24; B64C 9/22; B64C 13/28
See application file for complete search history.

(56) References Cited

U.S. PATENT DOCUMENTS

| | | |
|---|---|---|
| 2,350,751 A | 6/1944 | Spitzer |
| 3,822,047 A | 7/1974 | Schuldt, Jr. |
| 4,725,026 A | 2/1988 | Krafka et al. |

(Continued)

FOREIGN PATENT DOCUMENTS

| | | |
|---|---|---|
| EP | 0193442 | 9/1986 |
| EP | 1547917 A1 | 6/2005 |

(Continued)

OTHER PUBLICATIONS

Airbus, "Getting to Grips with Aircraft Performance," Jan. 2002.

(Continued)

*Primary Examiner* — Valentina Xavier

(57) ABSTRACT

A slat control system for an aircraft may include a flight control computer configured to generate a gap command in response to an occurrence of a gap-command condition. The slat control system may further include an edge control system including an edge control device having a plurality of control device positions including at least one designated control device position. The slat control system may additionally include a device actuation system configured to move a leading edge device of an aircraft. The edge control system may be configured to automatically command the device actuation system to extend the leading edge device from a sealed position to a gapped position when the edge control device is in the designated control device position and the gap command is received by the edge control system.

20 Claims, 16 Drawing Sheets

(56) References Cited

U.S. PATENT DOCUMENTS

| | | | |
|---|---|---|---|
| 4,729,528 A | 3/1988 | Borzachillo | |
| 4,821,981 A | 4/1989 | Gangsaas et al. | |
| 4,838,503 A | 6/1989 | Williams | |
| 5,056,741 A | 10/1991 | Bliesner | |
| 5,803,408 A | 9/1998 | Gast | |
| 5,839,699 A * | 11/1998 | Bliesner | 244/214 |
| 5,927,656 A * | 7/1999 | Hinkleman | 244/203 |
| 6,152,405 A | 11/2000 | Muller | |
| 7,494,094 B2 | 2/2009 | Good et al. | |
| 7,641,152 B2 | 1/2010 | Onu et al. | |
| 7,726,610 B2 | 6/2010 | Good et al. | |
| 8,356,766 B2 | 1/2013 | Garthaffner | |
| 8,424,810 B1 | 4/2013 | Shmilovich et al. | |
| 2002/0074459 A1* | 6/2002 | Gleine et al. | 244/214 |
| 2005/0011994 A1 | 1/2005 | Sakurai et al. | |
| 2005/0151028 A1 | 7/2005 | Pohl | |
| 2006/0049308 A1 | 3/2006 | Good et al. | |
| 2010/0200704 A1 | 8/2010 | Berens et al. | |
| 2010/0219299 A1* | 9/2010 | Holzhausen | 244/214 |
| 2010/0258679 A1* | 10/2010 | Knacke et al. | 244/214 |
| 2011/0127385 A1 | 6/2011 | Morris | |
| 2012/0032030 A1 | 2/2012 | Ruckes et al. | |
| 2012/0097791 A1* | 4/2012 | Turner et al. | 244/1 N |
| 2013/0320151 A1* | 12/2013 | Kordel et al. | 244/215 |
| 2014/0061387 A1* | 3/2014 | Reckzeh et al. | 244/208 |

FOREIGN PATENT DOCUMENTS

| | | |
|---|---|---|
| EP | 2465770 | 6/2012 |
| FR | 2902756 | 12/2007 |
| GB | 2186849 | 8/1987 |
| WO | WO9915403 | 4/1999 |

OTHER PUBLICATIONS

Delta Virtual Airlines, "Boeing 777-200ER Aircraft Operating Manual," Nov. 2005.
The Boeing Company, "777 Flight Crew Operations Manual—Flight Controls," Dec. 15, 2003.
Mingione, "Flight in Icing Conditions," Oct. 1997.
Boeiong Aero, "Angle of Attack," Year 4th Qtr. 2000.
Dept. of Transportation, "Aircraft Noise Evaluation," Sep. 1968.
Boeing Aero, "Quiet Climb," 1st Qtr. 2003.

* cited by examiner

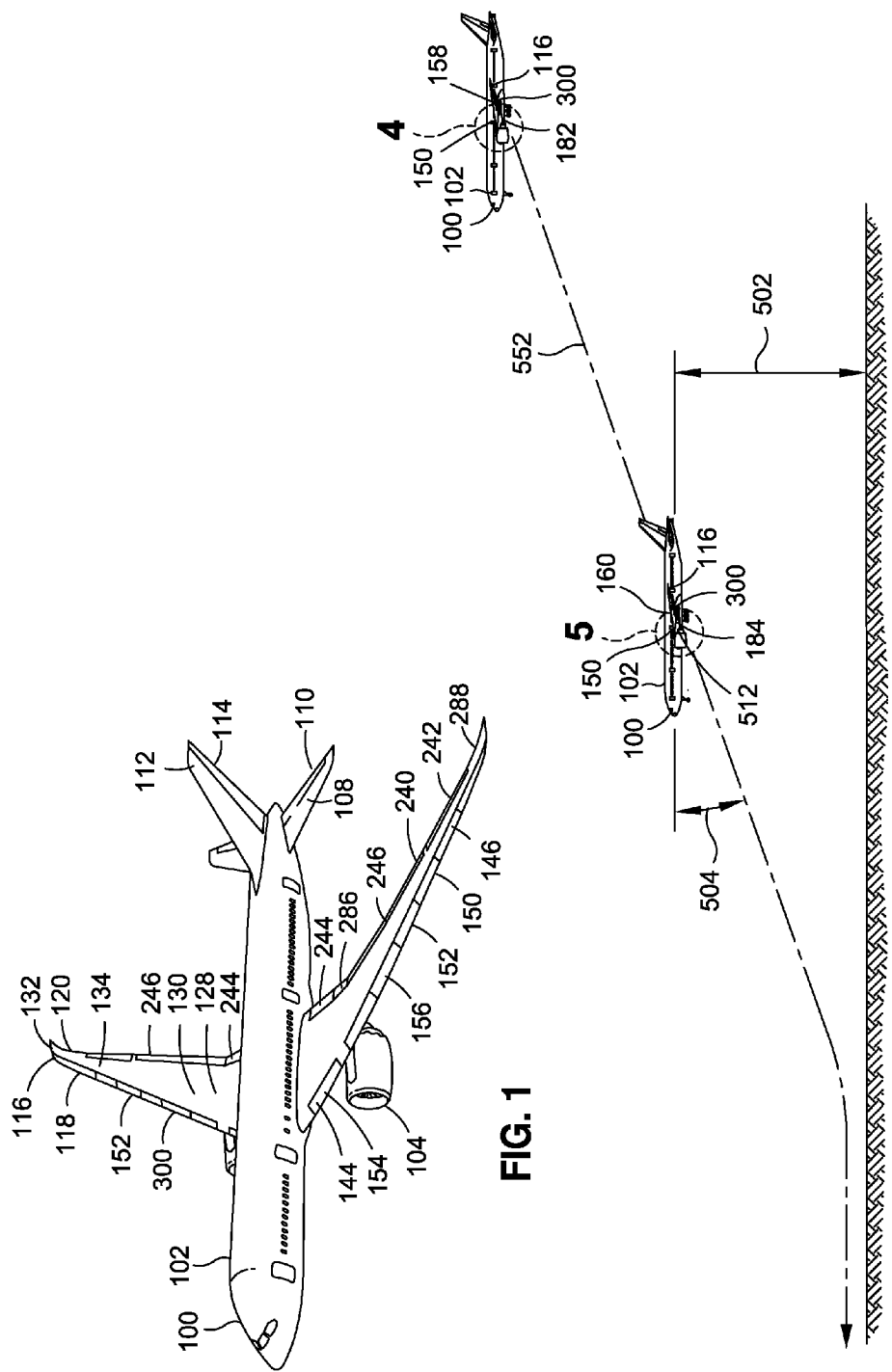

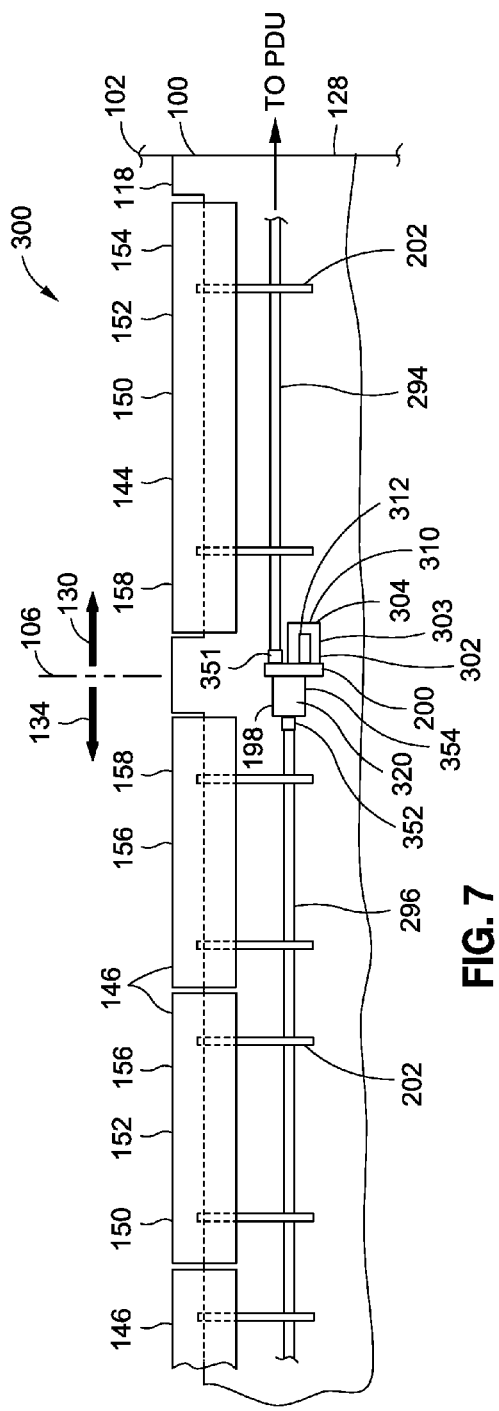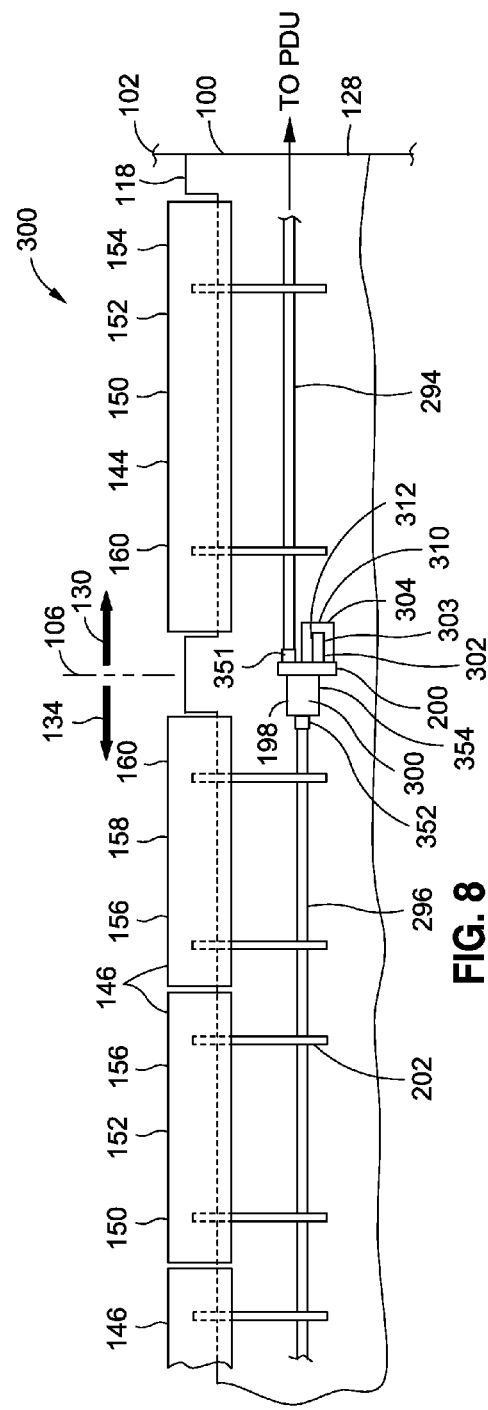

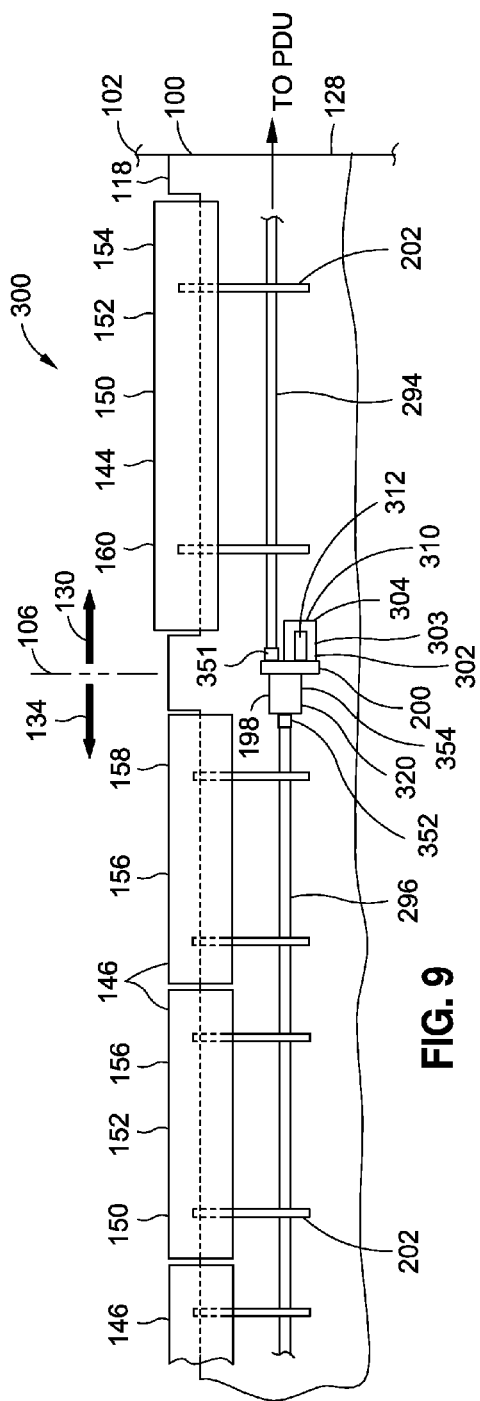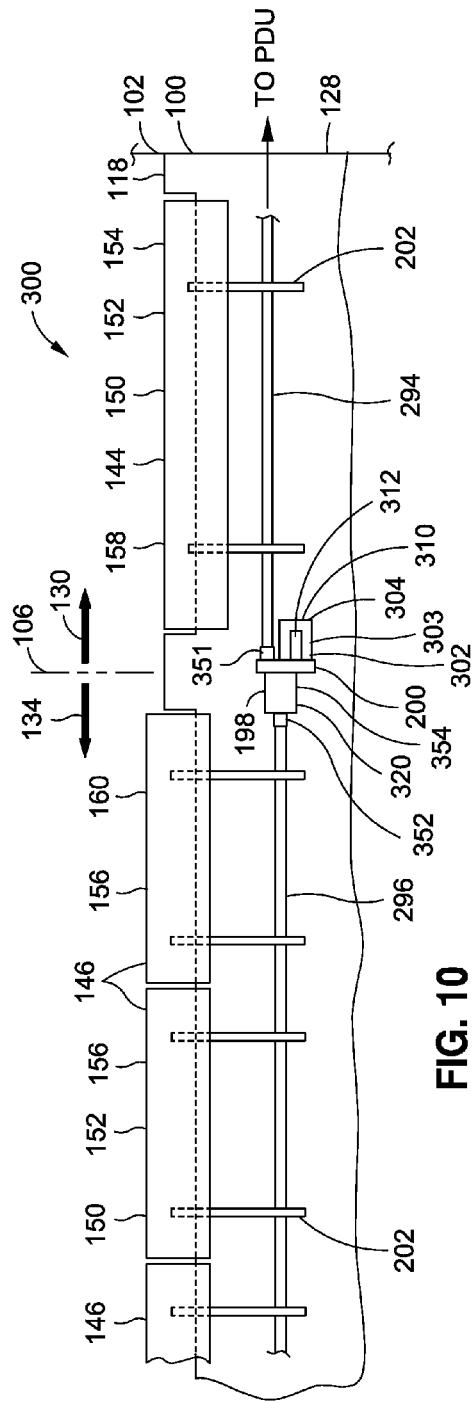

LEADING EDGE SYSTEM AND METHOD FOR APPROACH NOISE REDUCTION

FIELD

The present disclosure relates generally to flight controls and, more particularly, to the positioning of leading edge devices of an aircraft.

BACKGROUND

Aircraft such as commercial airliners typically include control surfaces or devices mounted on the wings to improve the aerodynamic performance of the aircraft. Such control surfaces include wing leading edge devices and trailing edge devices which may be extended during different phases of flight to alter the lift characteristics of the wings. For example, commercial airliners typically include leading edge slats which may be extended during takeoff, approach, landing, and/or during other flight phases to increase the area and camber of the wings to increase the wing lift characteristics.

Aircraft governing bodies such as the Federal Aviation Administration (FAA) administer noise certification regulations which set limits on the amount of noise that an aircraft may produce during takeoff and landing. For noise certification, the FAA requires the measurement of takeoff noise and landing noise to verify that such noise is below defined limits. Landing noise includes noise generated during approach and may be measured from a measurement location on the ground underneath the aircraft glide slope as the aircraft approaches the runway threshold.

A significant portion of the approach noise generated by an aircraft is the result of air flowing over and around airframe components such as the extended landing gear and the wing leading edge and trailing edge devices. For example, air flowing around the edges of extended slats and flaps contributes to the approach noise generated by an aircraft. Engine noise also contributes to the approach noise of an aircraft. However, the noise contribution from the engines during approach is generally less than the noise contribution during takeoff due to the relatively low power settings of the engines during approach.

There may be a need in the art for a system and method for controlling wing leading edge devices in a manner that may reduce or minimize noise on approach and may generally improve the performance of an aircraft.

SUMMARY

The present disclosure describes a slat control system for an aircraft having a leading edge device mounted to a wing. The slat control system may include a flight control computer configured to generate a gap command in response to an occurrence of a gap-command condition. The slat control system may further include an edge control system including an edge control device having a plurality of control device positions including at least one designated control device position. The slat control system may additionally include a device actuation system configured to move the leading edge device. The edge control system may be configured to automatically command the device actuation system to extend the leading edge device from a sealed position to a gapped position when the edge control device is in the designated control device position and the gap command is received by the edge control system.

Also disclosed is a method of minimizing approach noise of an aircraft. The method may include moving an edge control device to a designated control device position. The method may further include generating a gap command if a gap-command condition occurs and if the edge control device is in the designated control device position. The method may additionally include automatically commanding the leading edge device from a sealed position to a gapped position responsive, at least in part, to the gap command.

Also disclosed is a further embodiment of a method of minimizing noise of an aircraft having an inboard leading edge device and an outboard leading edge device. The method may include moving an edge control device of an edge control system to a designated control device position, and positioning the inboard leading edge device and the outboard leading edge device in a sealed position. The method may further include determining, using a flight control computer, an occurrence of a gap-command condition of the aircraft, and generating, using the flight control computer, a gap command when the gap-command condition occurs. The method may additionally include automatically commanding, using the edge control system, a device actuation system to extend the outboard leading edge device from the sealed position to a gapped position while retaining the inboard leading edge device in the sealed position.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a perspective illustration of an aircraft;

FIG. 2 is a diagrammatic view of an aircraft on approach;

FIG. 7 is a diagrammatic plan view of a leading edge of the wing taken along line 7 of FIG. 3 and schematically illustrating a variable camber trim unit (VCTU) positioned between an inboard slat and an outboard slat mounted to the wing leading edge;

FIG. 8 is a diagrammatic plan view of the leading edge of the wing of FIG. 7 illustrating the inboard slat and the outboard slat actuated in unison;

FIG. 9 is a diagrammatic plan view of the leading edge of the wing of FIG. 7 illustrating the inboard slat actuated independently of the outboard slat;

FIG. 10 is a diagrammatic plan view of the leading edge of the wing of FIG. 7 illustrating the outboard slat actuated independently of the inboard slat;

DETAILED DESCRIPTION

Figure 3:
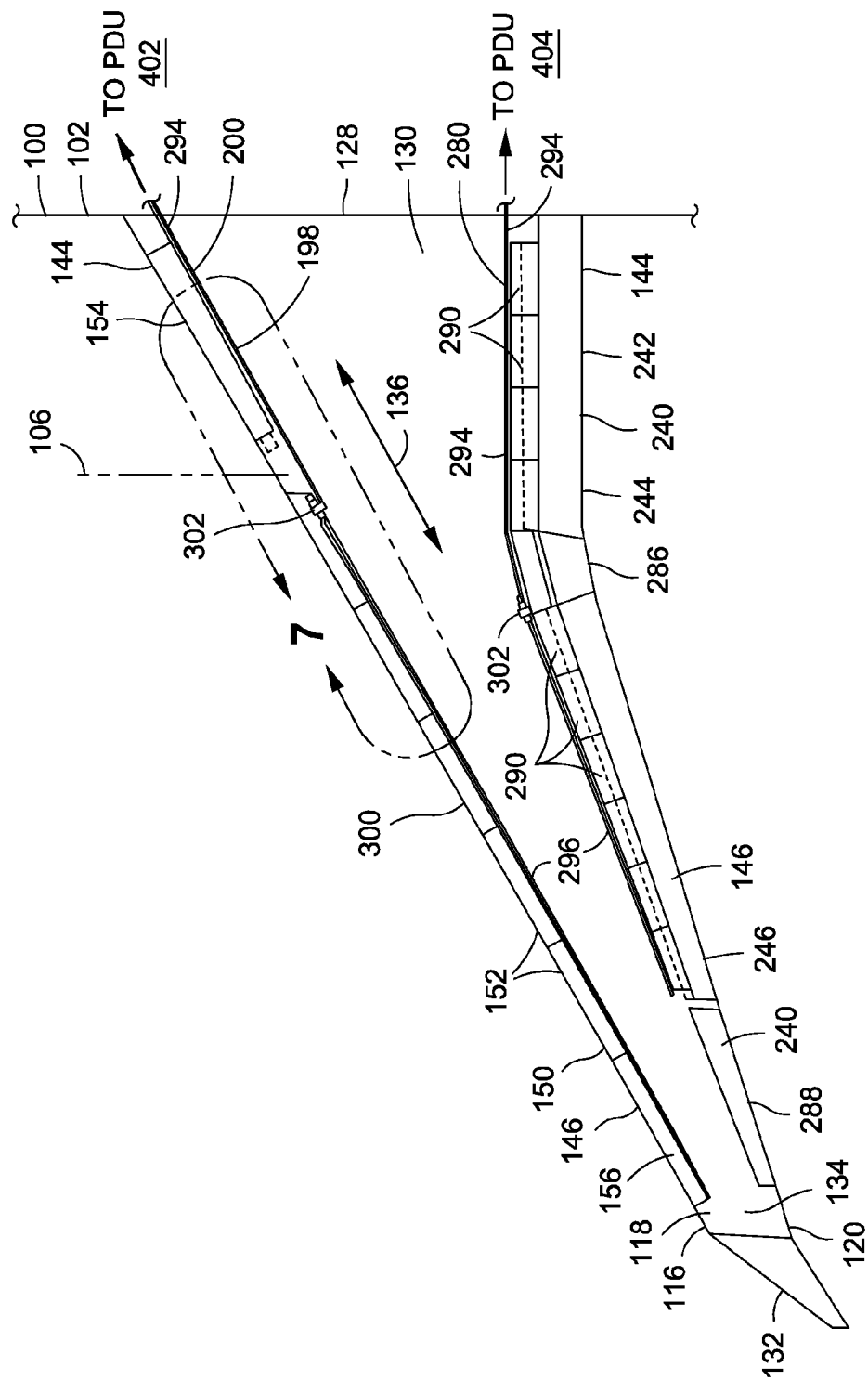
FIG. 3 is a top view of a wing of an aircraft.

As noted above, on conventional aircraft, the leading edge slats may be fully extended to a gapped position during approach and landing. In the gapped position, the slats may be positioned at a spaced distance from the wing such that a gap is formed. Airflow through the gap between the slats and the wings delays flow separation over the wing upper surface which may increase the stall margin of the wings at high angles of attack. An increased stall margin during approach is desirable due to the relatively low altitude for stall recovery.

When the leading edges slats are in the fully extended or gapped position, the slats protrude further into the airflow which generates increased aerodynamic drag. Airflow through the gap also generates increased aerodynamic drag relative to a non-gapped position of the slats. The increased aerodynamic drag generated by the slats requires a higher engine thrust setting which results in an increase in engine noise that adds to the cumulative approach noise generated by the aircraft. Airflow through the gap also generates additional aerodynamic noise which adds to the airframe noise generated by the aircraft on approach.

Conventional aircraft may include an autogap function which allows the slats to be maintained in a sealed position until the aircraft approaches a stall, at which point the autogap function enables automatic extension of the leading edge slats. The autogap function must meet challenging requirements in terms of the minimal amount of time allowed to actuate the slats, and with regard to relatively high actuation loads that are required for actuating the slats. In this regard, autogap performance requirements often determine the size and therefore the weight of the leading edge actuation system components. Furthermore, autogap performance requirements may be a significant factor in the sizing of the aircraft hydraulic system.

Referring now to the drawings wherein the showings are for purposes of illustrating various embodiments of the disclosure, shown in FIG. 1 is a perspective view of an aircraft 100 having a fuselage 102 and a pair of wings 116. Each wing 116 may be attached to the fuselage 102 at a wing root 128 and may extend outwardly toward a wing tip 132. The aircraft 100 may include one or more propulsion units 104 which may be mounted to the wings 116. The aircraft 100 may further include an empennage including a horizontal tail 108 and elevator 110, and a vertical tail 112 and rudder 114. The aircraft 100 may include one or more leading edge devices 150 and one or more trailing edge devices 240 which may be extended to alter the lift characteristics of the wings 116.

Figure 5:
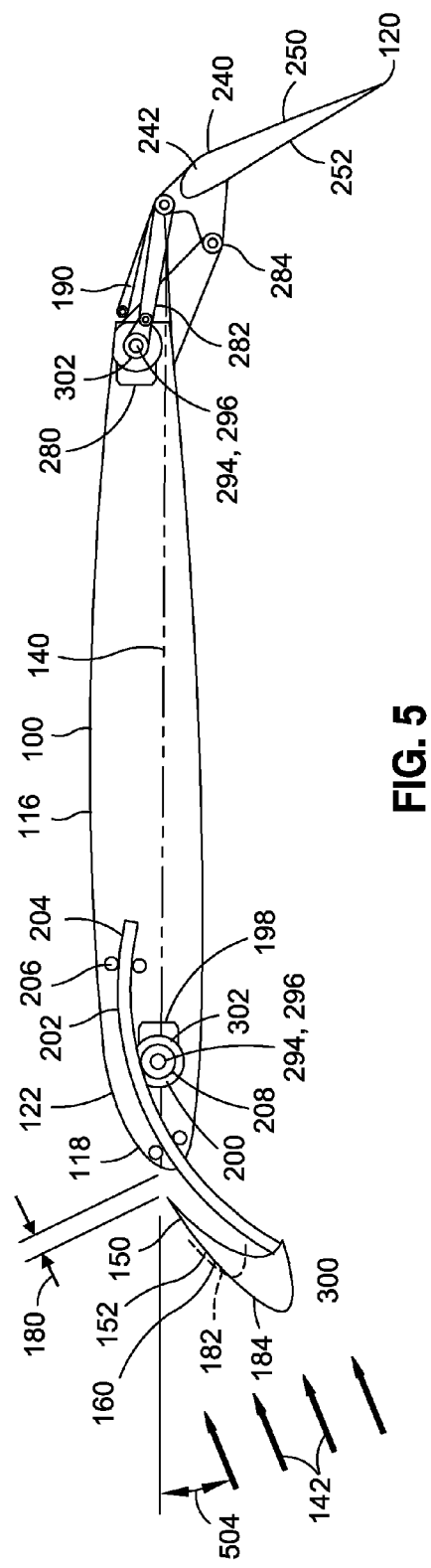
FIG. 5 is a sectional view of a wing with the slat in a gapped position.
Figure 6:
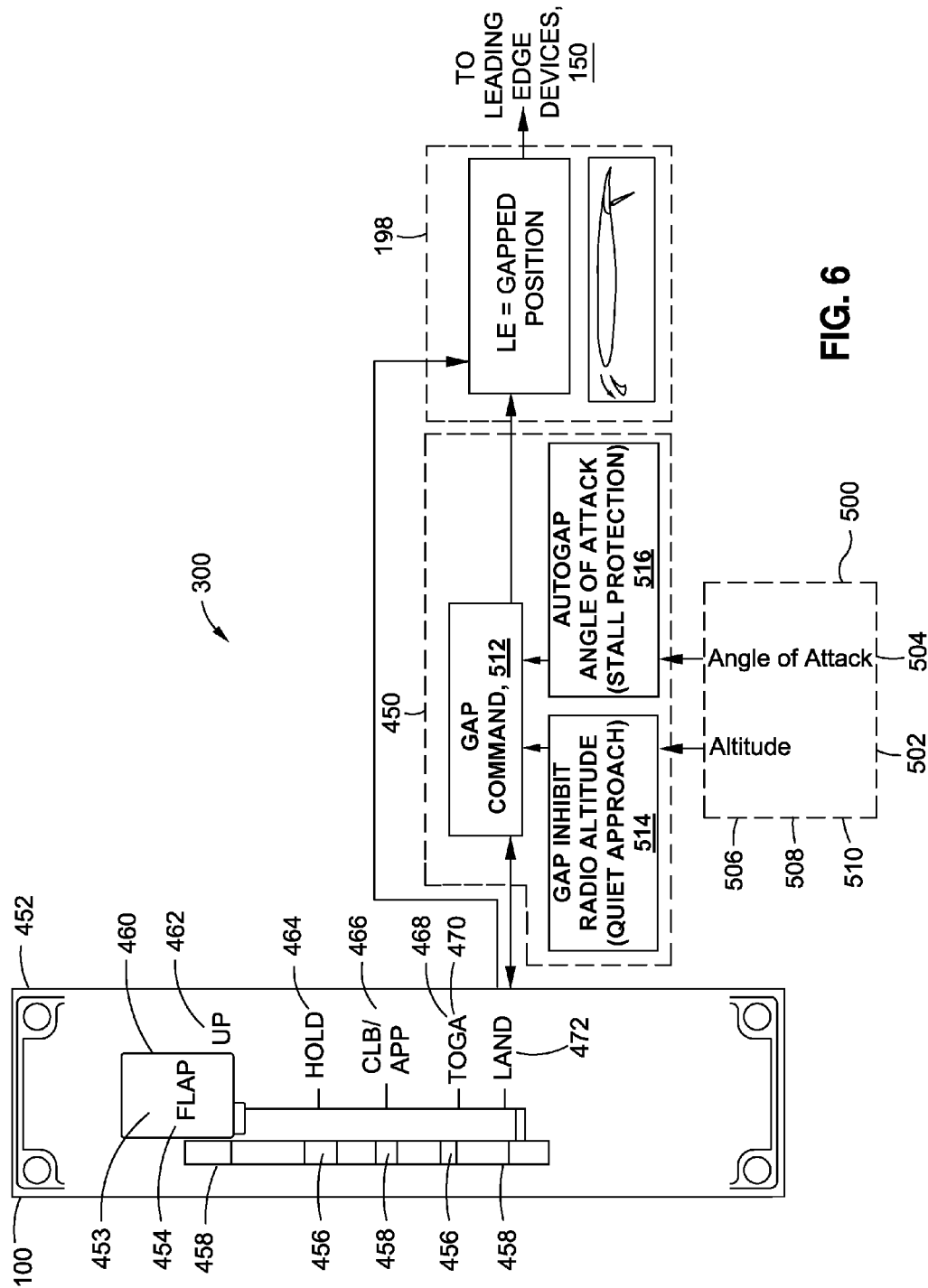
FIG. 6 is a diagrammatic view of an embodiment of a sealed-approach slat system for automatically extending the slats to a gapped position when a flight control computer generates a gap command.

FIG. 2 is a diagrammatic view of an aircraft 100 on a glide slope 552 during final approach in preparation for landing. During the approach, the landing gear may be extended. In addition, the trailing edge devices 240 (e.g., flaps 242) may be moved to a takeoff or approach flaps setting 252 (FIGS. 4-5), or a landing flaps setting (not shown). The aircraft 100 may include a slat control system 300 which may be configured to maintain the leading edge devices 150 (e.g., slats 152) in a partially extended and sealed position 182 during approach, for example when a certain condition is met. For example, the slat control system may be configured to maintain the leading edge devices 150 in a sealed position 182 when the actual radio altitude 502 of the aircraft 100 exceeds a gap-inhibit radio altitude 514 (FIG. 6). The slat control system 300 may facilitate noise reduction as will be described herein and appreciated by those skilled in the art.

The slat control system 300 may include a flight control computer 450 (FIG. 6) that may generate a gap command 512, for example when the aircraft 100 descends below the gap-inhibit radio altitude 514. The slat control system 300 may further include a device actuation system 198 (e.g., a slat actuation system 200), and may automatically command the device actuation system 198 to extend the leading edge devices 150 from the sealed position 182 to a gapped position 184 responsive, at least in part, to the gap command 512. By "automatic" or "automatically," it is meant in the context of the present application that the action (e.g., command, control, movement, deployment, extension, etc.) occurs or is performed without manual input (e.g., from the flight crew or other operator). The gap-inhibit radio altitude 514 may be preselected as the altitude below which approach noise is no longer critical. For stall protection, the flight control computer 450 may generate a gap command 512 when an actual angle of attack 504 of the wings 116 exceeds a predetermined autogap threshold angle of attack 516. In some examples, the slat control system 300 may be configured to cause the device actuation system 198 to extend the leading edge devices 150 from the sealed position 182 to the gapped position 184, regardless of the radio altitude of the aircraft 100.

In FIG. 2, the slat control system 300 may be operable to reduce aircraft noise as perceived on the ground (i.e., community noise), for examples by maintaining the leading edge devices 150 in the sealed position 182 while the aircraft 100 is above the gap-inhibit radio altitude 514. With the leading edge devices 150 in the sealed position 182, a reduced amount of aerodynamic drag may be generated by the leading edge devices 150 relative to the amount of aerodynamic drag generated by the leading edge devices 150 in a gapped position 184. A reduction in the aerodynamic drag (e.g., as may be generated by the sealed leading edge devices 150) may also allow for a reduction in the thrust setting of the propulsion units 104 resulting in a reduction in propulsive noise or engine noise generated by the aircraft 100 on approach. Airframe noise may also be reduced by maintaining the leading edge devices 150 in the sealed position 182 which may prevent noise generated by airflow passing through the gap 180 (FIG. 5) between the wings 116 and the leading edge devices 150 in the gapped position 184. Although the slat control system 300 is described in the context of a tube-and-wing aircraft configuration as shown in FIGS. 1-2, the sealed-approach slat system 300 may be implemented in any aircraft configuration, without limitation, including a blended wing configuration, a hybrid wing-body configuration, and other aircraft configurations.

Referring to FIG. 3, shown is a plan view of an aircraft wing 116 having leading edge devices 150 and trailing edge devices 240 respectively mounted to the wing leading edge 118 and wing trailing edge 120. The leading edge devices 150 may include one or more inboard leading edge devices 144 and one or more outboard leading edge devices 146. In an embodiment, the leading edge devices 150 may include inboard slats 154 and outboard slats 156. However, the inboard devices and/or the outboard devices may be configured in configurations other than slats 152. For example, the inboard leading edge devices 144 may be configured as Krueger flaps 242 or other device configurations that are movable from a sealed position 182 to a gapped position 184 relative to the wing leading edge 118. In the present disclosure, the propulsion unit centerline 106 may be described as the dividing line between the inboard leading edge devices 144 and the outboard leading edge devices 146. However, any point along a spanwise direction 136 of the wing 116 may serve as the dividing line between the inboard and outboard leading edge devices 144, 146.

In FIG. 3, the wing 116 may include trailing edge devices 240 such as flaps 242 or other trailing edge device configurations. Similar to the leading edge devices 150, the trailing edge devices 240 may include inboard devices and outboard devices. For example, the inboard devices may include one or more inboard flaps 244, and an inboard roll-control flap device configured as a flaperon 286 (e.g., a combination flap-aileron). The outboard devices may include one or more outboard flaps 246 and an outboard roll-control flap device such as an aileron 288. However, the trailing edge devices 240 may be provided in alternative configurations including, but not limited to, elevons and other trailing edge device configurations.

In FIG. 3, the inboard devices on the leading edge 118 and trailing edge 120 of the wing 116 may each be coupled to an inboard torque tube 294 or other mechanical linkage as part of a device actuation system 198. In an embodiment, the inboard torque tube 294 on the leading edge 118 and the inboard torque tube 294 on the trailing edge 120 may each be coupled to a centrally-located power drive unit (PDU) 400 as described below. The wing 116 may further include spoilers 290 mounted on a wing upper surface 122 and which may be operated as speed brakes for decelerating the aircraft 100 during flight and/or for reducing aerodynamic lift of the wings 116 such as during landing after touchdown to allow the weight of the aircraft 100 to be transferred to the landing gear for improved breaking performance.

Figure 4:
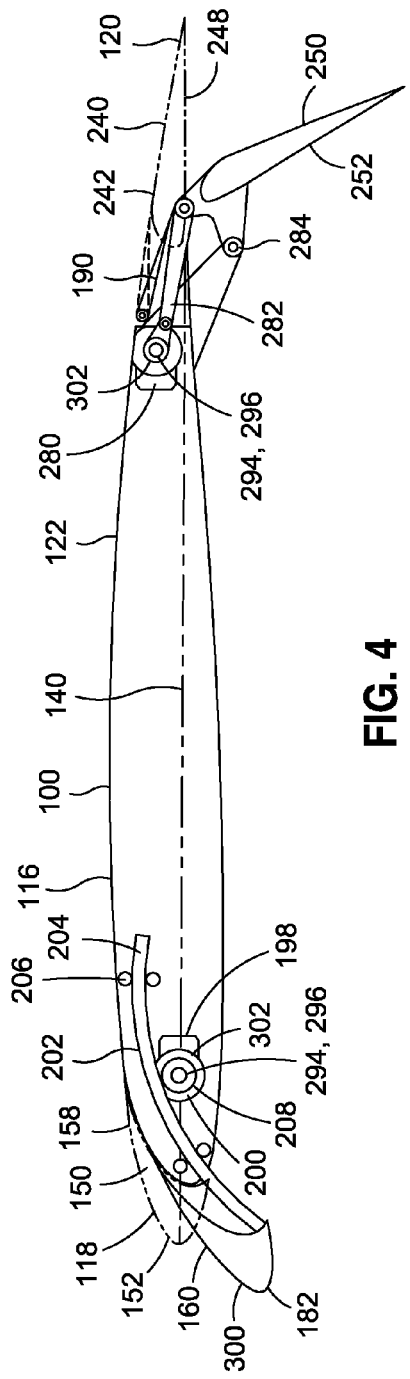
FIG. 4 is a sectional view of a wing with a slat in a sealed position.

As shown in FIG. 3, the device actuation system 198 may include a variable camber trim unit (VCTU) 302, which may be operatively coupled to leading edge devices 150 and/or trailing edge devices 240 and which may enable movement of inboard and/or outboard devices independent of one another. In some examples, the VCTU 302 may be positioned between an inboard device and an outboard device on the leading edge 118 and/or trailing edge 120 of the wing 116 and may allow for independent actuation of the inboard devices and outboard devices. In this regard, the VCTU 302 may be configured to move a subset of the leading edge devices 150 from a first position, e.g., the sealed position 182, to a second position, e.g., the gapped position 184 upon the generation of a gap command 512, while another subset of leading edge devices 150 is maintained in position. For example, if the flight control computer 450 determines that an actual angle of attack 504 exceeds an autogap threshold angle of attack 516, the device actuation system 198 may be configure to move (e.g., via the VCTU 302) the outboard slats 156 to the gapped position 184 (FIG. 5) while the inboard slats 154 are retained in the sealed position 182 (FIG. 4). After positioning the outboard slats in the gapped position 184, the device actuation system 198 may be configured to move the inboard slats 154 to the gapped position 184.

The slat control system 300 may be configured to improve stall characteristics of the aircraft 100, e.g., by positioning only the outboard slats 156 in a gapped position 184 prior to positioning the inboard slats in a gapped position 184. This may be due, in part, to a tendency of the inboard portion 130 of the wing 116 to stall prior to the outboard portion 134 of the wing 116. By providing the outboard slats in a gapped position 184 prior to providing the inboard slats in a gapped position 184 a nose down pitching moment of the aircraft 100 may be generated, which may aid in stall recovery. In some examples, providing a subset of the leading edge devices 150 in a gapped position 184 at a given time may reduce power requirements for actuating the leading edge devices 150. A reduction in power requirements may allow for a reduction in component sizing and a corresponding reduction in weight, hydraulic demand, and generally a reduction in complexity of certain systems of the aircraft.

Referring to FIG. 4, shown is a cross section of an embodiment of a wing 116 having a leading edge device 150 configured as a slat 152 and a trailing edge device 240 configured as a flap 242. The slat 152 and the flap 242 are shown in phantom lines in their respective retracted positions 158, 248, and are shown in solid lines in one of several respective deployed positions 160, 250. The trailing edge flap 242 is shown as a simple flap supported on a drop hinge 284. However, the flap 242 may be provided in any one of a variety of different trailing edge device 240 configurations including, but not limited to, a plain flap, a single-slotted flap, a multi-slotted Fowler flap, or any one of a variety of other flap configurations. The flap 242 may be actuated by a flap actuation system 280 using a trailing edge linkage assembly 282 that may be coupled to a torque tube 294, 296. The flap actuation system 280 may include a trailing edge PDU 404 (FIG. 11) which may operate in conjunction with a VCTU 302, which may be positioned between an inboard flap 244 and an outboard flap 246 on each wing 116. The deployment and retraction of the flaps 242 may be effected by rotating the torque tubes 294, 296 using the PDU 404 and/or the VCTUs 302.

In FIG. 4, the leading edge devices 150 (e.g., slat 152) is shown deployed from a retracted position 158 (phantom lines) to a sealed position 182 (solid lines) relative to the fixed leading edge 118 of the wing 116. As indicated above, although the leading edge device 150 is shown as a slat 152, the leading edge device 150 may be provided in any one of a variety of alternative leading edge device 150 configurations (e.g., a Krueger flap). The leading edge devices 150 may be movable between the retracted position 158 (FIG. 4), the sealed position 182 (FIG. 4), and the gapped position 184 (FIG. 5). The leading edge devices 150 (e.g., slat 152) may be actuated by a device actuation system 198 such as a slat actuation system 200. In some examples, each slat 152 may be supported by one or more carrier track assemblies 202. Each carrier track assembly 202 may include one or more arcuate guide tracks 204 which may be supported by one or more guide rollers 206 mounted to the wing 116 structure. A pinion gear 208 may be mounted on the torque tube 294, 296 for engaging gear teeth (not shown) on the guide track 204. Extension and retraction of the slats 152 may be effectuated by rotating the torque tubes 294, 296 and pinion gear 208 using the PDU 402 and/or the VCTUs 302. Other implementations for the carrier track assembly 202 or different actuation mechanisms as may be known in the art may be used without departing from the scope of the present disclosure.

Referring to FIG. 5, shown is a cross section of the wing 116 illustrating the leading edge device 150 (e.g., slat 152) extended from the sealed position 182 (FIG. 4) to the gapped position 184, for example to increase the wing camber and/or form a gap 180 between the slat 152 and the wing 116. When the slat 152 is in the gapped position 184, air may flow through the gap 180 which may delay flow separation over the wing upper surface 122 and may improve stall performance, e.g., at high angles of attack. As indicated above, the leading edge device 150 (e.g., slat 152) may be automatically extended upon the occurrence of a gap-command condition as may be determined by the flight control computer 450 (FIG. 6). For example, the flight control computer 450 may generate a gap command 512 when the actual angle of attack 504 of the wing 116 exceeds an autogap threshold angle of attack 516 (FIG. 6). As noted, an autogap threshold angle of attack 516 may be preprogrammed into the flight control computer 450, or may be calculated by the flight control computer 450 based on aircraft state data 500 (FIG. 6). Aircraft state data 500 may be continuously provided to the flight control computer 450, as described below, and in some examples, the autogap threshold angle of attack 516 may be continuously or periodically updated based on updated aircraft state data 500. In the present disclosure, the actual angle of attack 504 may be described as the angle between a local wing chord line 140 and the direction of oncoming airflow 142 relative to the wing 116.

Referring to FIG. 6, shown is a diagrammatic view of an embodiment of the slat control system 300. The slat control system 300 may include the flight control computer 450, as mentioned above, which may be configured to generate a gap command 512 based on aircraft state data 500 received by the flight control computer 450. The slat control system 300 may further include an edge control system 452 which may be communicatively coupled to the flight control computer 450. The edge control system 452 may be configured for controlling the position of the leading edge devices 150 and/or the trailing edge devices 240 (FIG. 5).

The edge control system 452 may be integrated into a flight control system (not shown) of the aircraft 100, and may be mounted on a console or control stand (not shown) on the flight deck. The edge control system 452 may include an edge control device 453 which may be movable into any one of a plurality of control device positions 458 corresponding to one or more settings for leading edge devices 150 and/or trailing edge devices 240 of the aircraft 100. The plurality of control device positions 458 may include at least one designated control device position 460. The edge control device 453 may be movable to the designated control device position 460 which may trigger a response from the slat control system 300. The slat control system 300 may further include a device actuation system 198, as described above, which may be configured to extend and retract the leading edge devices 150 and/or trailing edge devices 240 based on commands from the edge control system 452.

In FIG. 6, in an embodiment, the edge control device 453 may implemented as a flap control lever 454 that may be movable along a forward-and-aft direction. The flap control lever 454 may be positionable at one or more control device positions 458 or flap lever positions. However, the edge control device 453 may be provided in alternative implementations such as a pushbutton device (not shown), a rotary dial (not shown), an electronic controller (e.g., a touchpad—not shown) or other embodiments, and the present disclosure is not limited to a lever. The edge control device 453 may include one or more mechanical gates 456 to prevent movement of the flap control lever 454 past the gate 456 unless the flap control lever 454 is lifted, depressed, or otherwise manipulated past the gate 456 as a means to prevent inadvertent retraction of the leading edge devices 150 and/or the trailing edge devices 240.

In FIG. 6, the control device positions 458 may include a cruise position 462 indicated as UP, a hold position 464 indicated as HOLD, a climb position or approach position 466 indicated as CLB/APP, a takeoff position 468 or go-around position 470 indicated as TOGA, and a landing position 472 indicated as LAND. Alternative control device positions 458 may be included with the edge control system 452. In addition, the control device positions 458 may be indicated by different nomenclature, and are not limited to the designations shown in FIG. 6. For example, the control device positions 458 may include UP, F1, F5, F20, and F30, or the control device positions 458 may include 0, 1, 2, 3/OPT, FULL, and which may generally correspond to the above-noted UP, HOLD, CLB/APP, TOGA, and LAND control device positions 458.

In FIG. 6, the edge control device 453 may be moveable from the cruise position 462 to a designated control device position 460 such as the approach position 466. The slat control system 300 may be configured to cause the leading edge devices 150 to move from a retracted position 158 (phantom lines—FIG. 4) to a sealed position 182 (solid lines—FIG. 4) responsive to movement of the edge control device 453 to the designated control device position 460. The flight control computer 450 may be configured to inhibit or prevent movement of the leading edge devices 150 from the sealed position 182 to the gapped position 184 if the actual ratio altitude of the aircraft is greater than the gap-inhibit radio altitude 514.

The flight control computer 450 may be configured to automatically determine whether a gap-command condition exists, for example when the edge control device 453 is provided in a designated control device position 460. The flight control computer 450 may be programmed to determine that a gap-command condition exists based on aircraft state data 500, such as actual radio altitude 502, and/or actual angle of attack 504. The flight control computer 450 may be programmed to generate a gap command 512 when the flight control computer 450 determines that a gap-command condition exists. The gap command 512 may be received by the edge control system 452 causing the edge control system 452 to automatically command (e.g., without manual input by the flight crew) the one or more leading edge devices 150 from a sealed position 182 (FIG. 4) to a gapped position 184 (FIG. 5). For example, the edge control system 452 may be configured to automatically command the slat actuation system 200 to extend the slats 152 from the sealed position 182 to the gapped position 184 if the flap control lever 454 is in the approach position 466 (e.g., CLB/APP), the takeoff position 468 or go-around position 470 (e.g., TOGA), or the landing position 472 (e.g., LAND) and an occurrence of a gap-command condition has been detected or determined.

In some examples, the edge control system 452 may automatically command the slat actuation system 200 to extend the slats 152 to the gapped position 184 when the flap control lever 454 is in a designated control device position 460 other than the approach position 466, the takeoff position 468, or the landing position 472. The slat control system 300 may be configured such that the leading edge devices 150 (e.g., slats 152) initially remain in the sealed position 182 when the edge control device 453 (e.g., flap control lever 454) is in a non-designated control device position. For example, when the flap control lever 454 is in the cruise position 462 or hold position 464, the leading edge devices 150 may remain in the sealed position 182 regardless of the angle of attack of the wings 116. In further examples, the flight control computer 450 may be programmed to generate a gap command 512 upon the occurrence of a gap-command condition and may be configured to transmit a command directly to the device actuation system 198 to move the leading edge device 150 from a first position to a second position responsive, at least in part, to the occurrence of the gap-command condition.

In FIG. 6, the flight control computer 450 may receive aircraft state data 500 regarding the sensed or actual state of the aircraft 100 for determining whether a gap-command condition exists. For example, the flight control computer 450 may receive aircraft state data 500 from an angle of attack indicator (not shown) or other instrumentation configured to provide an indication of the actual angle of attack 504 (FIG. 5) of the wings 116 relative to oncoming airflow 142 (FIG. 5). The flight control computer 450 may also receive data from a radio altimeter (not shown) or other instrumentation indicating the actual radio altitude 502 (FIG. 2) of the aircraft 100 above the ground. The flight control computer 450 may determine whether the actual angle of attack 504 exceeds the autogap threshold angle of attack 516 as an indication of a gap-command condition. The flight control computer 450 may also determine whether the actual radio altitude 502 of the aircraft 100 is above the gap-inhibit radio altitude 514 such that the flight control computer 450 inhibits movement of the leading edge devices 150 from the sealed position 182 to minimize the noise level of the aircraft 100 on approach.

In FIG. 6, the gap-inhibit radio altitude 514 may be preprogrammed into the flight control computer 450 as a fixed value, or the gap-inhibit radio altitude 514 may be manually entered into the flight control computer 450 before or during a flight by the pilot or flight crew. For example, the gap-inhibit radio altitude 514 may be manually entered as an integer value (e.g., 250 feet above ground level—see FIG. 2) into the flight control computer 450 during initial descent or as part of an approach checklist. Likewise, the autogap threshold angle of attack 516 may be preprogrammed into the flight control computer 450 as a fixed value, or the autogap threshold angle of attack 516 may be manually entered into the flight control computer 450 by the flight crew before or during a flight. If preprogrammed into the flight control computer 450, the sealed-approach slat system 300 may be configured to allow the pilot or flight crew to manually alter or change the gap-inhibit radio altitude 514 and/or change the autogap threshold angle of attack 516 at any time during the flight. Further in this regard, the flight control computer 450 may be configured to automatically (e.g., without manual input) revise or change the gap-inhibit radio altitude 514 and/or autogap threshold angle of attack 516 based on aircraft state data 500 that may be continuously provided to the flight control computer 450 during a flight.

In FIG. 6, the aircraft state data 500 may include virtually any aircraft 100 parameter which may affect or pertain to the performance of aircraft 100. As noted previously, the aircraft state data 500 may include actual radio altitude 502 and actual angle of attack 504. In some examples, aircraft state data 500 may include aircraft gross weight 508, aircraft center of gravity 510, forward and vertical airspeed 506, and other aircraft state data 500, which may be provided to the flight control computer 450 for determining the occurrence or existence of a gap-command condition. The aircraft state data 500 may be continuously or periodically updated as aircraft parameters (e.g., gross weight, angle of attack, radio altitude, etc.) may vary over time. The flight control computer 450 may continuously or iteratively process the aircraft state data 500 (e.g., updated aircraft state data) to determine the occurrence of a gap-command condition or the continued existence of the gap-command condition after a gap-command condition has been determined to exist.

The aircraft state data 500 may also include data regarding the detection of ice on the aircraft 100. For example, the aircraft 100 may include one or more ice detectors (not shown) for detecting the accumulation of ice such as on a wing 116 or on wing leading edge devices 150. Upon the detection of an icing condition or the detection of ice accretion on the aircraft 100, the slat control system 300 may be configured for manual adjustment (e.g., reduction of) the autogap threshold angle of attack 516 and/or adjustment (e.g., increase of) the gap-inhibit radio altitude 514 at which the gap-command condition is triggered. In some examples, the flight control computer 450 may be configured to automatically adjust the autogap threshold angle of attack 516 and/or the gap-inhibit radio altitude 514 to compensate for icing conditions and/or ice accretion.

In some embodiments, the flight control computer 450 may be configured to continuously monitor aircraft state data 500 to determine whether a gap-command condition continues to exist. For example, the flight control computer 450 may continuously monitor aircraft state data 500 whenever the edge control device 453 (e.g., the flap control lever 454) is in a designated control device position 460 such as in the approach flaps position 466, the takeoff flaps position 468, or the landing flaps position 472. In addition, the edge control system 452 may automatically command (i.e., without manual input) the device actuation system 198 to retract one or more of the leading edge devices 150 from the gapped position 184 to the sealed position 182 when the gap-command condition ceases to exist. For example, the gap-command condition may cease to exist if the aircraft 100 climbs to an actual radio altitude 502 that is higher than the gap-inhibit radio altitude 514 and the actual angle of attack 504 of the wings is less than the autogap-threshold angle of attack 516.

Figure 11:
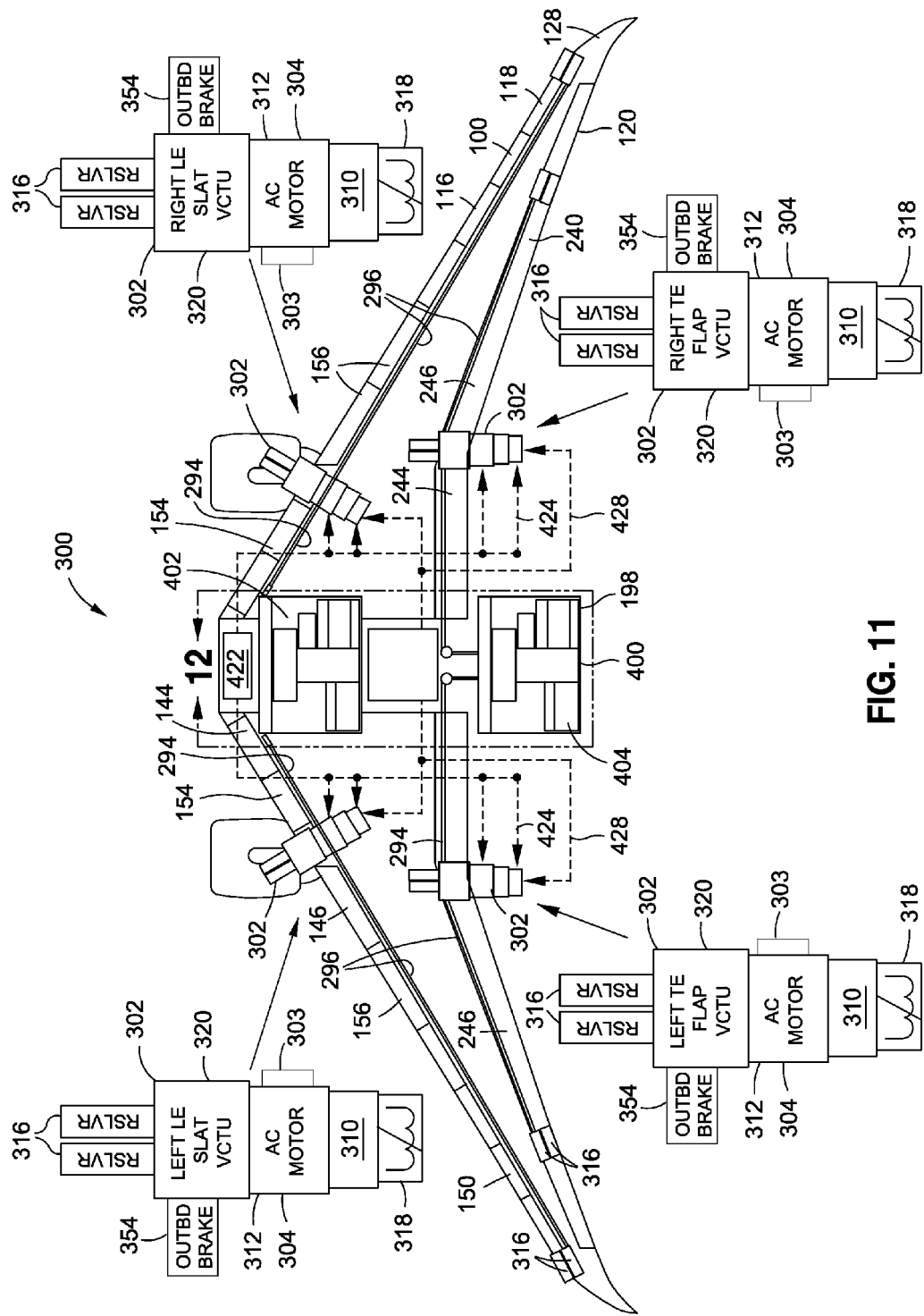
FIG. 11 is a diagrammatic plan view of a wing incorporating a VCTU between the inboard and outboard slats, and a VCTU between the inboard and outboard flaps on each wing.

Referring to FIG. 7, shown is diagrammatic plan view of a leading edge 118 of a wing 116 schematically illustrating a VCTU 302 positioned between an inboard leading edge device 144 (e.g., an inboard slat 154) and outboard leading edge devices 146 (e.g., outboard slats 156). In FIG. 7, the inboard slat 154 may be coupled to an inboard torque tube 294 and the outboard slats 156 may be coupled to an outboard torque tube 296. The VCTU 302 may include a dedicated electric motor 304 which may be operated in conjunction with the speed sum gearbox 320 and an outboard brake 354. The inboard slat 154 may be driven by a central motor 406 (FIG. 11) of the leading edge PDU 402 (FIG. 11). As described in greater detail below, the VCTU 302 may be included with the device actuation system 198 and may be operated in conjunction with the PDU 402 to extend and retract the inboard and outboard slats 154, 156 independent of one another. For example, upon the generation of a gap command 512 by the flight control computer 450, the VCTU 302 may be activated to initially extend the outboard slats to the gapped position 184 while the PDU is non-activated so that the inboard slats are momentarily retained in the sealed position 182. By initially providing power to the VCTU to move the outboard slats and keeping the PDU idle to prevent retain the inboard slats in the sealed position 182, actuation power requirements for autogapping the leading edge devices 150 may be reduced relative to an arrangement where all of the leading edge devices 150 are simultaneously actuated.

In FIG. 8, shown is a diagrammatic view of the wing leading edge 118 of FIG. 7 illustrating the operation of the VCTU 302 in conjunction with the leading edge PDU 402 to actuate the outboard slat 156 and the inboard slat 154 in unison to a gapped position 184 upon generation of a gap command 512. As described below, the power-off brake 310 of the VCTU 302 may be applied to prevent rotational movement of the electric motor 304. The central motor 406 (FIG. 11) of the leading edge PDU 402 (FIG. 11) may be activated for actuating the inboard slat 154. With the power-off brake 310 applied, actuation of the inboard slat 154 by the central motor 406 of the leading edge PDU 402 may rotate the inboard torque tube 294. When the power-off brake 310 of the VCTU 302 is applied, the rotational movement of the inboard torque tube 294 may be transferred through the speed sum gearbox 320 to the outboard torque tube 296 resulting in actuation of the inboard slat 154 and the outboard slat 156 in unison.

In FIG. 9, shown is a diagrammatic view of the wing leading edge 118 of FIG. 7 illustrating the actuation of the inboard slat 154 independently of the outboard slats 156. For independent actuation of the inboard slats 154, the power-off brake 310 of the electric motor 304 may be released. The outboard brake 354 of the VCTU 302 may be applied to prevent rotation of the outboard slats 156. The central motor 406 (FIG. 11) of the leading edge PDU 402 (FIG. 11) may be activated resulting in rotation of the inboard torque tube 294. The speed sum gearbox 320 of the electric motor 304 may be configured such that rotation of the inboard torque tube 294 causes the electric motor 304 to be back-driven while the inboard slat 154 is actuated by the central motor 406 of the leading edge PDU 402.

In FIG. 10, shown is a diagrammatic view of the wing leading edge 118 of FIG. 7 and illustrating the actuation of the outboard slats 156 independently of the inboard slat 154. In an embodiment, the slat control system 300 may be configured such that the edge control system 452 automatically commands the device actuation system 198 to extend one or more outboard leading edge devices 146 (e.g., the outboard slats 156) from the sealed position 182 (FIG. 4) to the gapped position 184 (FIG. 5) prior to extending one or more inboard leading edge devices 144 (e.g., the inboard slat 154) from the sealed position 182 to the gapped position 184. As indicated above, by initially moving only the outboard leading edge devices 146 to the gapped position 184, stall characteristics of the aircraft 100 may be improved due to the tendency of the reduced-camber inboard portion 130 (FIG. 3) of the wing 116 to stall prior to the increased-camber outboard portion 134 and causing the nose of the aircraft 100 to pitch down which may aid in stall recovery. In addition, by extending only the outboard leading edge devices 146 to the gapped position 184, total power requirements for actuating the leading edge devices 150 may be reduced as may hydraulic demand at the leading edge PDU 402. Advantageously, by reducing total power requirements for actuating the leading edge devices 150, actuating system components may be reduced in size which may reduce the weight of the aircraft resulting in improved payload capability, increased fuel efficiency, improved range, and/or other benefits.

In FIG. 10, for independent actuation of the outboard slats 156, the central motor 406 of the leading edge PDU 402 may be prevented from rotating the inboard device by applying a central brake 414 which may be coupled to the central motor 406. The outboard brake 354 of the VCTU 302 may be released. Additionally, the power-off brake 310 of the electric motor 304 may be released. The electric motor 304 may then be activated causing rotation of the outboard torque tube 296 and resulting in actuation of the outboard slats 156 independently of the inboard slat 154. In this manner, upon detection by the flight control computer 450 of an gap-command condition 512, the edge control system 452 may automatically command the VCTU motor controller 303 to activate the electric motor 304 in a manner causing the outboard slats 156 to be extended from the sealed position 182 (FIG. 4) to the gapped position 184 (FIG. 5).

In FIG. 10, after the outboard slats 156 are extended to the gapped position 184, the outboard brake 354 of the VCTU 302 may be applied. With the power-off brake 310 of the VCTU electric motor 304 released, the central brake 414 of the leading edge PDU 402 may be released and the central motor 406 of the leading edge PDU 402 may be activated causing the inboard torque tube 294 to rotate. Rotation of the inboard torque tube 294 may cause the inboard slat 154 to be extended from the sealed position 182 to the gapped position 184 while the outboard slats 156 remain in the gapped position 184. The VCTU electric motor 304 may be back-driven while the inboard slat 154 is moved from the sealed position 182 to the gapped position 184.

In FIG. 11, shown is a diagrammatic view of a device actuation system 198 incorporating VCTUs 302 between the inboard leading edge devices 144 and outboard leading edge devices 146 on the leading edge 118 of each wing 116. A similar arrangement of VCTUs 302 may be implemented with the trailing edge devices 240. In the embodiment shown, the device actuation system 198 may include a leading edge PDU 402 coupled to the leading edge devices 150 on opposite sides of the fuselage 102, and a trailing edge PDU 404 coupled to the trailing edge devices 240 on opposite sides of the fuselage 102. The device actuation system 198 may be controlled by flight control electronics 422 which may be centrally-located on the aircraft 100 and/or may be positioned adjacent to one or both of the PDUs 400. The flight control electronics 422 may be configured to generate command signals for actuating the leading edge devices 150 and the trailing edge devices 240. The command signals may be transmitted via one or more command lines 424 or wirelessly transmitted to the leading edge PDU 402, the trailing edge PDU 404, and to the motor controller 303 of each VCTU 302.

In FIG. 11, each motor controller 303 may control the VCTU electric motor 304, the outboard brake 354, and/or the power-off brake 310 of the VCTU 302. The flight control electronics 422 may transmit command signals to the motor controller 303 of the VCTU electric motor 304 and to the central motor 406 causing actuation (e.g., deployment and retraction) of the inboard leading edge devices 144 and the outboard leading edge devices 146. The flight control electronics 422 may receive position signals from one or more position sensors 312 (see e.g., FIG. 13) that may be included with each one of the VCTUs 302. The position signals may represent the current position or deflection angle of each one of the inboard leading edge devices 144.

In FIG. 11, the device actuation system 198 may further include a central power supply 426 for powering the VCTU electric motor 304 of each one of the VCTUs 302. The power supply 426 may be centrally-located such as adjacent to the PDUs 400. In an embodiment, each VCTU electric motor 304 may include the above-mentioned motor controller 303 which may be powered by the central power supply 426 with a substantially continuous supply of relatively low-voltage power. Such low-voltage power may be removed from the motor controller 303 for certain types of faults. Relatively high-voltage power may be provided to the VCTU electric motors 304 from the central power supply 426 via an electric supply line 428 to cause the VCTU electric motor 304 to rotate such as in response to a command signal transmitted along a command line 424 from the flight control electronics 422 to the motor controller 303.

As shown in FIG. 11, each one of the VCTUs 302 may include a VCTU electric motor 304 and a speed sum gearbox 320. An outboard brake 354 may be included with each VCTU 302 to prevent rotation of the outboard device 146 as indicated above. The VCTU 302 may include the above-mentioned power-off brake 310 which may be coupled to the VCTU electric motor 304 and which may be applied by one or more coils 318. The coils 318 may receive power from the centrally-located central power supply 426 via an electric supply line 428 for activating the power-off brake 310 such as in response to a command signal received from the flight control electronics 422 via a command line 424. One or more resolvers 316 may be included at different locations on the leading edge devices 150 and/or trailing edge devices 240 for indicating the positions of such devices 150, 240 and which may be provided to the flight control electronics 422.

Figure 12:
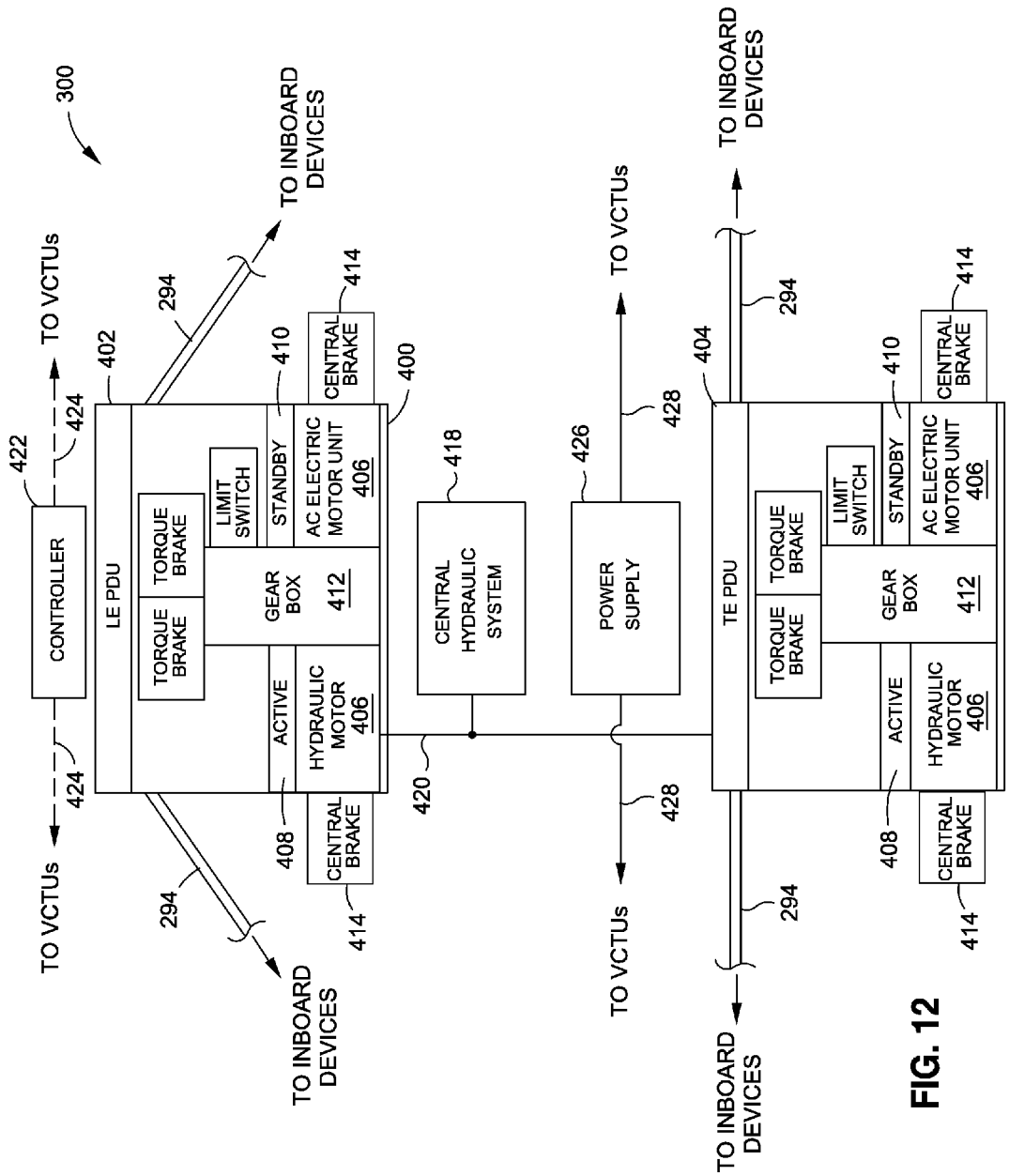
FIG. 12 is a diagrammatic view of a center portion of the wing of FIG. 11 and illustrating a leading edge power drive unit (PDU) for driving the inboard slats and a trailing edge PDU for driving the inboard flaps.

FIG. 12 is a diagrammatic view of a center portion of the variable camber actuation system showing the leading edge PDU 402 and the trailing edge PDU 404. As indicated earlier, the leading edge PDU 402 and the trailing edge PDU 404 may be coupled to the inboard torque tubes 294 on the respective leading edge 118 and trailing edge 120 of each wing 116. In an embodiment, each one of the PDUs 400 may include at least one central motor 406. For example, in FIG. 12, each one of the PDUs 400 may include an active motor 408 and a backup motor 410. Each one of the central motors 406 may be coupled to or may include a central brake 414 configured as a power-off brake for preventing rotation of the central motor 406 and thereby preventing actuation of the inboard device 144 to which the central motor 406 is coupled.

In FIG. 12, in an embodiment, the active motor 408 and/or the backup motor 410 may be configured as a hydraulic motor or an electrohydraulic actuator which may be coupled to a central hydraulic system 418 via one or more hydraulic lines 420. In an embodiment, the active motor 408 and/or the backup motor 410 may optionally be configured as an electromechanical actuator or an electric motor for controlling the actuation of the inboard devices. The central motors 406 of the leading edge PDU 402 may be coupled to the inboard torque tubes 294 for driving the inboard leading edge devices 144. The trailing edge PDU 404 may be coupled to the inboard devices on the trailing edge 120 in a manner similar to the leading edge PDU 402. Each one of the PDUs 400 may include a central gearbox 412 and one or more central brakes 414. Each one of the central motors 406 may be coupled to the central brake 414 (e.g., a power-off brake) which may be configured to prevent movement of the inboard devices when both central brakes 414 are applied.

Figure 13:
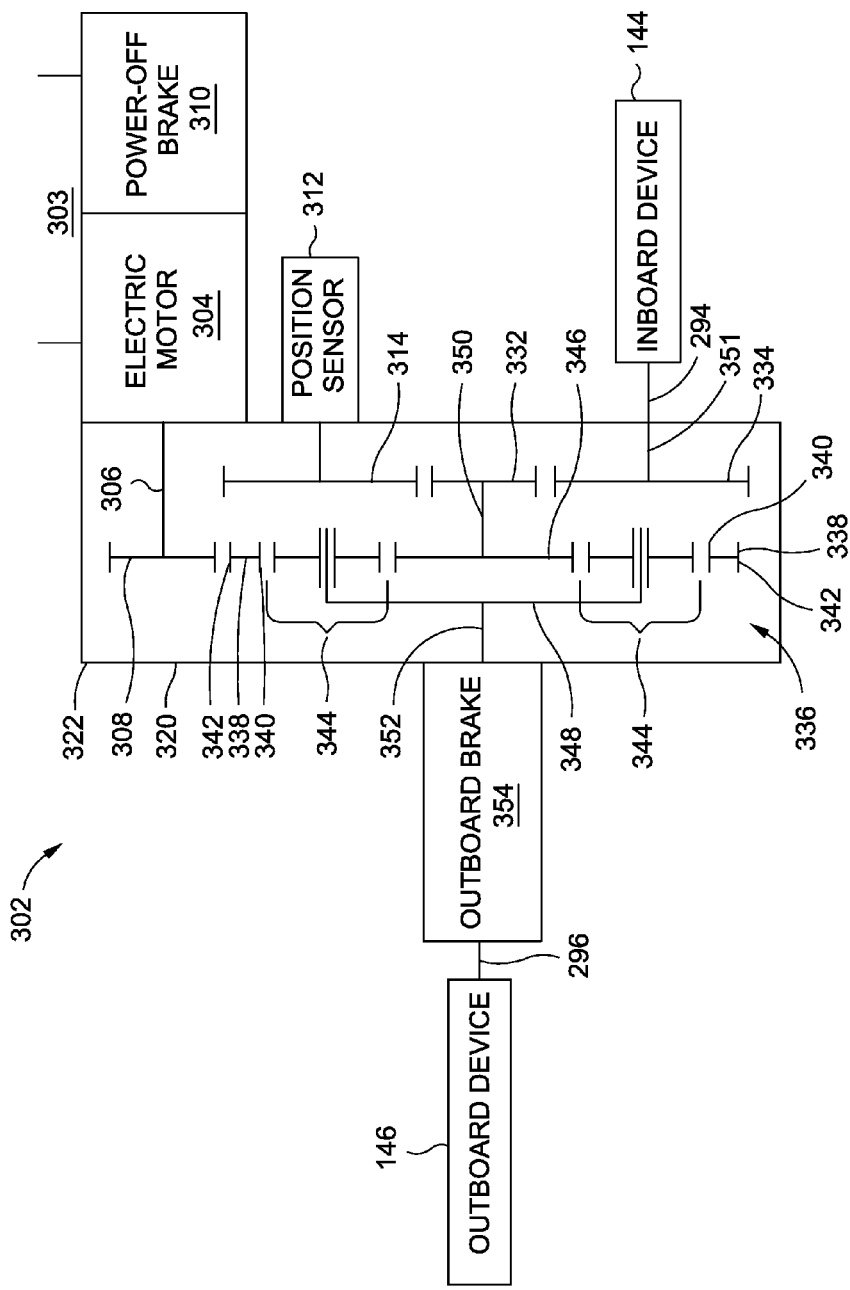
FIG. 13 is a schematic diagram of a VCTU including a speed sum gearbox having an outboard brake and a VCTU electric motor.

FIG. 13 is a schematic diagram of an embodiment of a VCTU 302 illustrating the interconnection of the speed sum gearbox 320 with the outboard brake 354, the VCTU electric motor 304 and power-off brake 310, and the position sensor 312. The arrangement of the VCTU 302 is described below in the context of the inboard and outboard leading edge devices 144, 146, and may be implemented in a similar manner for the trailing edge devices 240. The speed sum gearbox 320 includes an inboard shaft 351 that may be coupled to an inboard leading edge device 144 via an inboard torque tube 294, and an outboard shaft 352 that may be coupled to an outboard leading edge device 146 via an outboard torque tube 296. The VCTU electric motor 304 may include a motor shaft 306 having a motor pinion 308 that may be engaged to a ring gear 338 of the speed sum gearbox 320.

The speed sum gearbox 320 may be configured such that if one of the three shafts (i.e., the inboard shaft 351, the outboard shaft 352, the motor shaft 306) is held stationary and prevented from rotating, the remaining pair of shafts will rotate under the driving force of one of the remaining shafts of the pair. For example, if the inboard shaft 351 is prevented from rotating due to application of the central brake 414 of the PDU, then rotation of the motor shaft 306 will cause rotation of the outboard shaft 352 resulting in actuation of the outboard leading edge device 146 independent of the inboard leading edge device 144. If the motor shaft 306 is prevented from being rotated due to application of the power-off brake 310, then rotation of the inboard shaft 351 will cause rotation of the outboard shaft 352 resulting in actuation of the inboard and outboard leading edge devices 144, 146 in unison with one another. If the outboard shaft 352 is prevented from rotating due to application of the outboard brake 354, then rotation of the inboard shaft 351 by the central motor 406 will cause the VCTU electric motor 304 to be back-driven while the inboard leading edge device 144 is actuated and the outboard leading edge device 146 is stationary.

In FIG. 13, the inboard shaft 351 may be fixedly (e.g., non-rotatably) coupled to the inboard device 144 via the inboard torque tube 294. The outboard shaft 352 may be fixedly (e.g., non-rotatably) coupled to the outboard device 146 via the outboard torque tube 296. The inboard shaft 351 may include an inboard pinion 334 that may be coupled to an inboard gear 332 of the speed sum gearbox 320. The inboard gear 332 may be mounted on or fixedly (i.e., non-rotatably) coupled to a sun gear shaft 350 of a sun gear 346 of the speed sum gearbox 320. The position sensor 312 may include a position sensor gear 314 that may be engaged to the inboard gear 332 for sensing a position of the inboard leading edge device 144 and transmitting a position signal to the flight control electronics 422. The speed sum gearbox 320 may include a plurality of planet gears 344 that may be supported on a carrier 348. The carrier 348 may be fixedly (i.e., non-rotatably) coupled to or mounted on the outboard shaft 352. The planet gears 344 may encircle and may be engaged to the sun gear 346. The plurality of planet gears 344 may be circumscribed by a ring gear 338. The motor pinion 308 may be engaged to an external side 342 of the ring gear 338.

Figure 14:
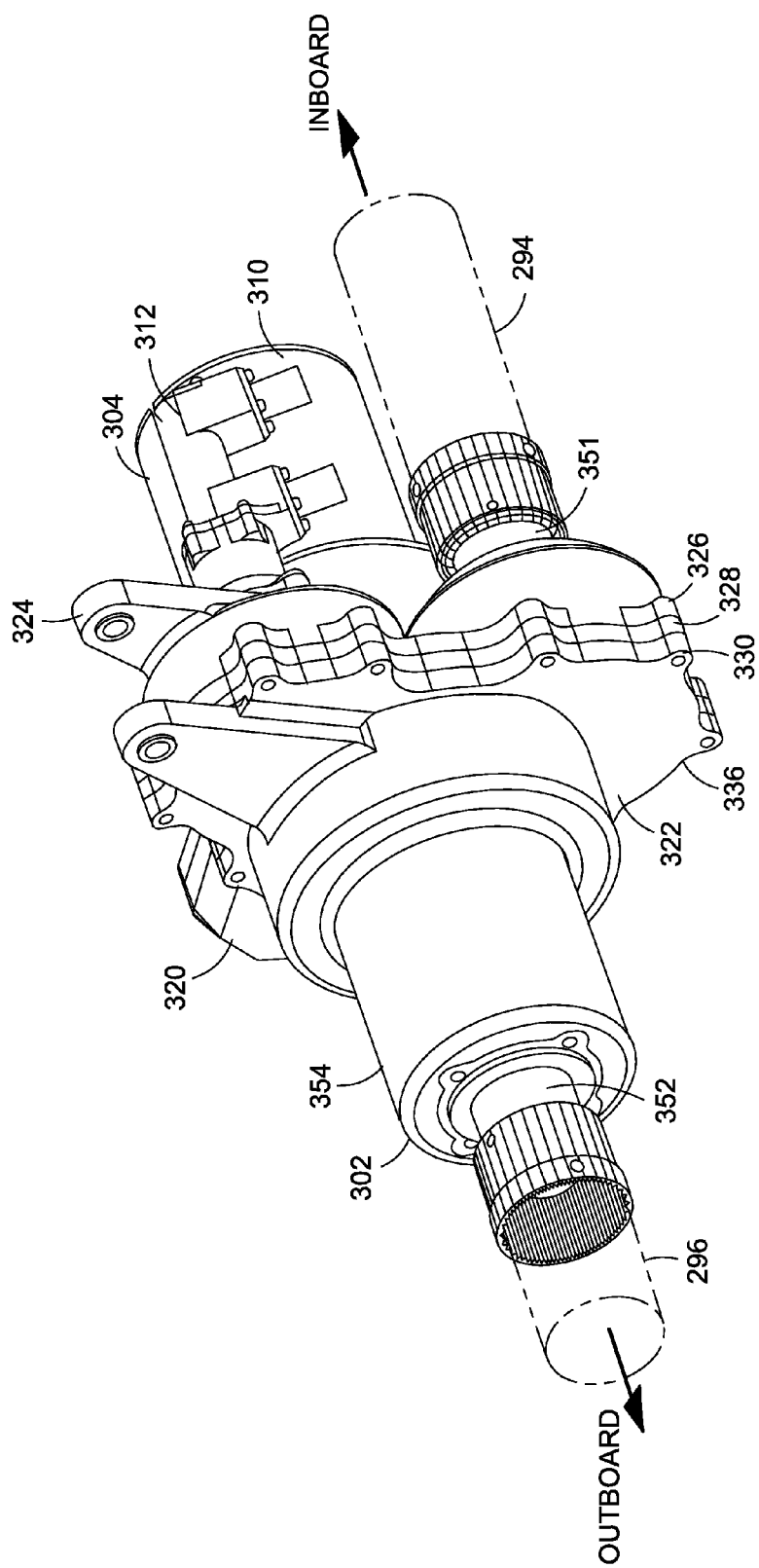
FIG. 14 is a perspective illustration of an embodiment of a VCTU.

FIG. 14 is a perspective illustration of an embodiment of the VCTU 302 and showing the inboard torque tube 294 coupled to the inboard shaft 351 and the outboard torque tube 296 coupled to the outboard shaft 352 of the speed sum gearbox 320. The VCTU 302 may comprise an integrated unit including the VCTU electric motor 304 and associated power-off brake 310, outboard brake 354, and position sensor 312, all of which may be supported by or enclosed, at least partially, within the VCTU housing 322. The VCTU housing 322 may include one or more mounting tabs 324 for mounting the VCTU 302 to the wing structure of an aircraft 100.

Figure 15:
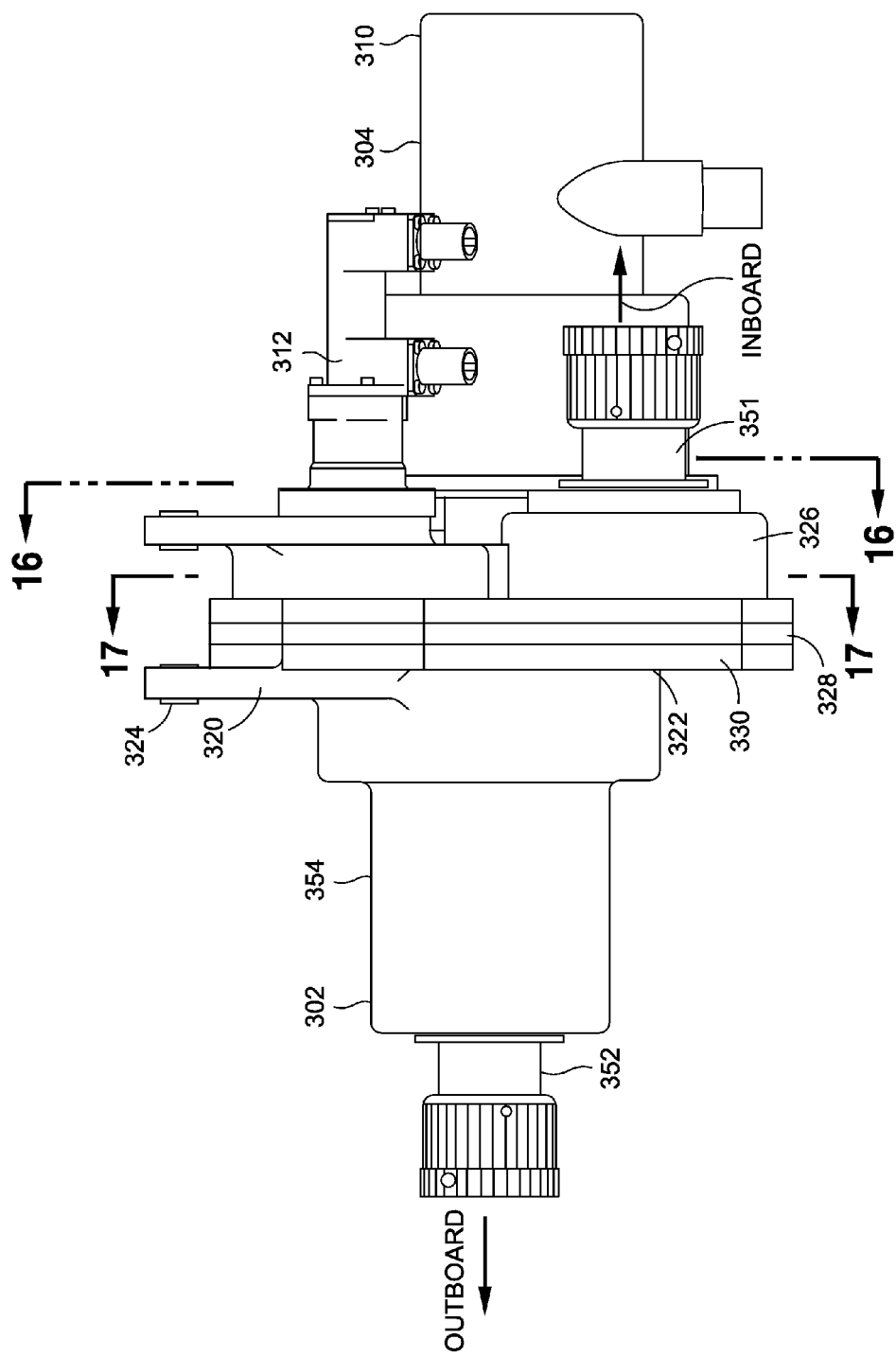
FIG. 15 is a forward-looking view of an aft side of the VCTU.

FIG. 15 is a forward-looking view of the VCTU 302 illustrating the VCTU housing 322. In an embodiment, the VCTU housing 322 may be made up of an inner housing 326 on the inboard side of the VCTU 302, an outer housing 330 on an outboard side of the VCTU 302, and a mid housing 328 sandwiched between the inner housing 326 and the outer housing 330. Although not shown, the inner housing 326, the mid housing 328, and the outer housing 330 may be mechanically coupled together such as with mechanical fasteners. The three-piece arrangement of the VCTU housing 322 may facilitate assembly and disassembly of the VCTU 302 such as for maintenance and inspection. Although not shown, the VCTU housing 322 may be sealed from the elements by a seal extending around a perimeter at the interface of the housings. The VCTU housing 322 may be configured to provide a relatively rigid load path for operational loads.

Figure 16:
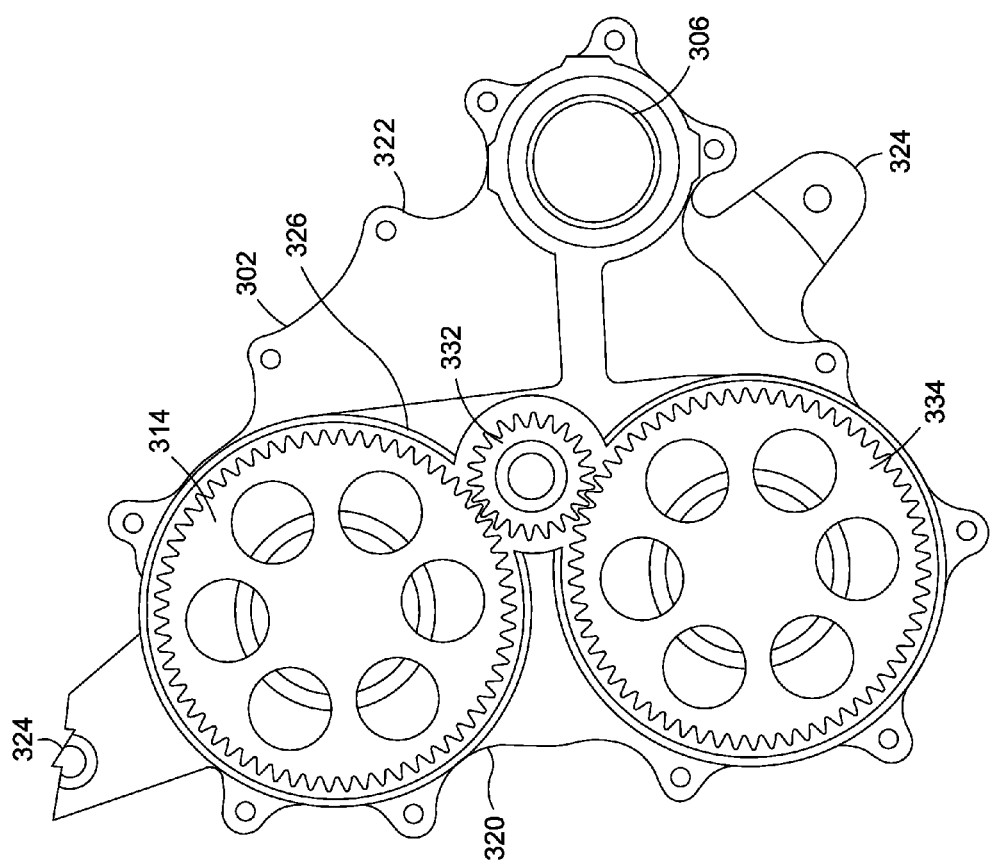
FIG. 16 is a sectional view of the VCTU taken along line 16 of FIG. 15 and illustrating the interconnectivity of an inboard pinion, an inboard gear, and a position sensor gear.

FIG. 16 is a sectional view of the VCTU 302 showing the inboard pinion 334 and the position sensor gear 314 operatively engaged to one another by the inboard gear 332. In an embodiment, the inboard gear 332 may be omitted, and the inboard shaft 351 may be directly coupled to the sun gear 346. In such an arrangement, the position sensor gear 314 may be engaged to another gear (not shown) that may be mounted on or integrally formed with the inboard shaft 351 to allow the position sensor 312 to sense the position of the inboard device 144 for transmitting a representative position signal to the flight control electronics 422.

Figure 17:
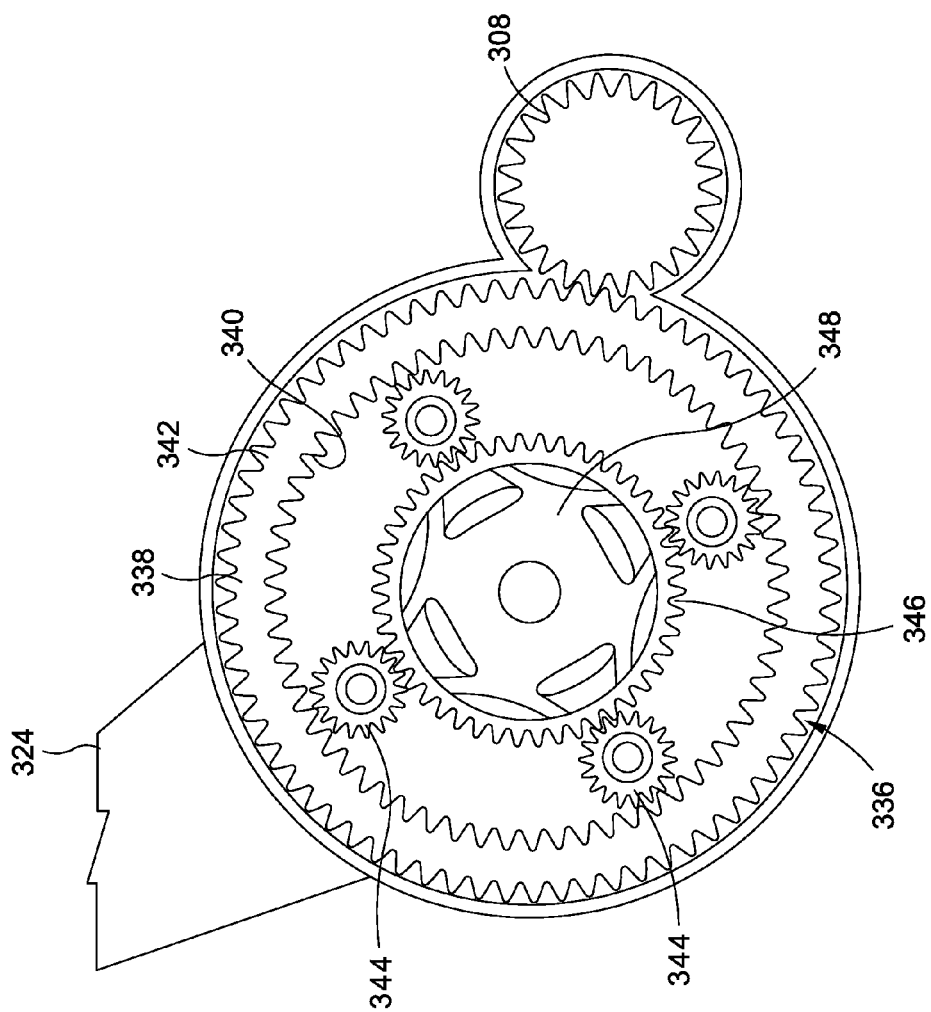
FIG. 17 is a sectional view of the VCTU taken along line 17 of FIG. 15 and illustrating the interconnectivity of a planetary gear system and the outboard brake.
Figure 18:
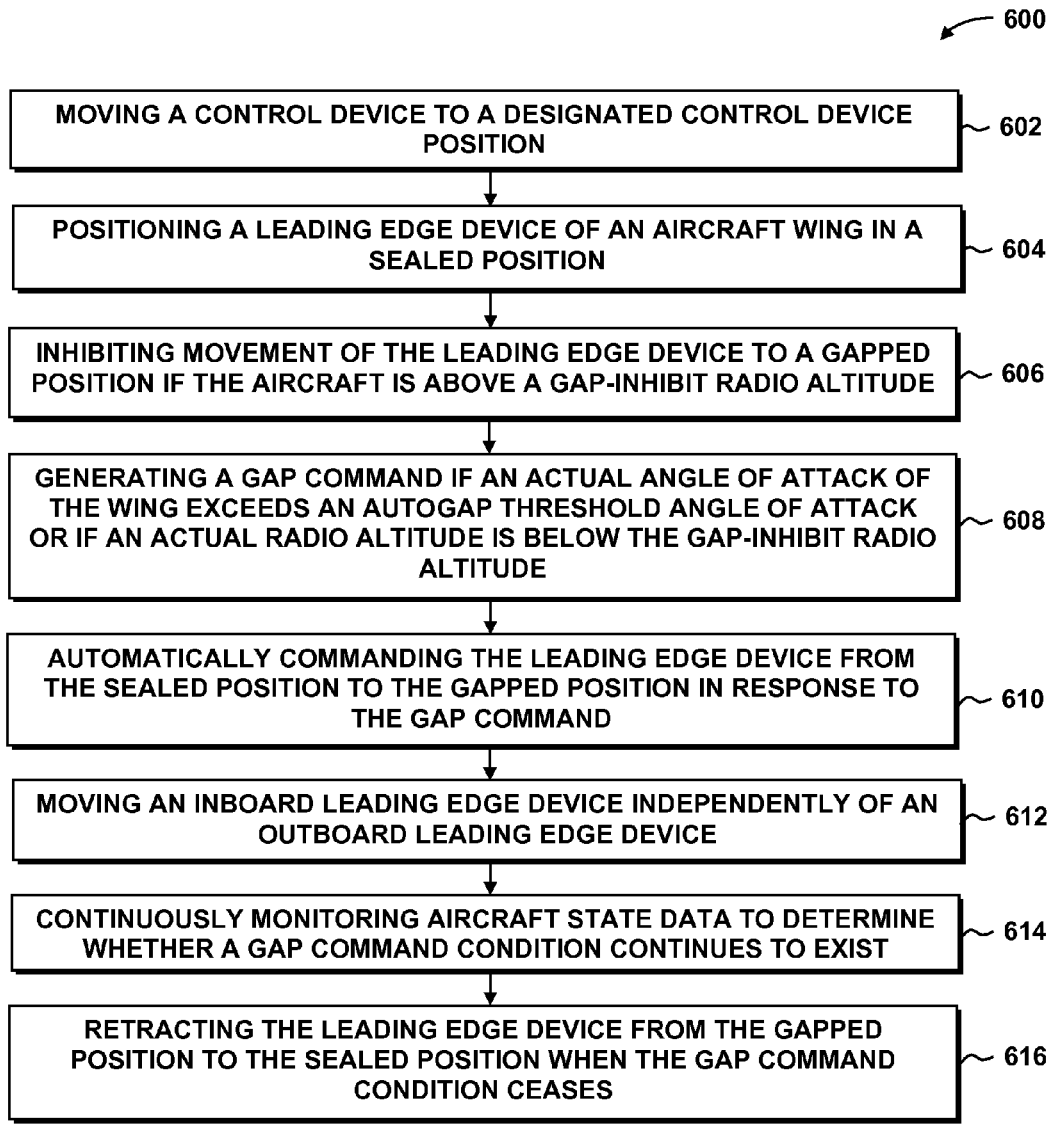
FIG. 18 is an illustration of a flow chart containing one or more operations that may be included in a method of operating a leading edge device in a manner minimizing noise of an aircraft.

FIG. 17 is a sectional view of the VCTU 302 showing the speed sum gearbox 320 configured as a planetary gear system 336. As indicated above, the speed sum gearbox 320 includes a central sun gear 346 having gear teeth and which is surrounded by a plurality of planet gears 344. The planet gears 344 are supported on the carrier 348 which may be fixedly mounted to the outboard shaft 352. The gear teeth of the planet gears 344 are engaged to the gear teeth on the internal side 340 of the ring gear 338 which circumscribes the planet gears 344. The motor pinion 308 of the VCTU electric motor 304 are engaged to the external side 342 of the ring gear 338. As indicated above, In FIG. 18, shown is a flow chart containing one or more operations that may be included in a method 600 of operating a leading edge device 150 in a manner that may minimize approach noise and/or provide stall protection for an aircraft 100. Step 602 of the method 600 of FIG. 18 may include moving a control device to a designated control device position 460. The control device may be an edge control device 453 of an edge control system 452 as described above. For example, as shown in FIG. 6, the edge control device 452 may comprise a flap control lever 454 that may be movable to a plurality of flap lever positions including one or more designated control device positions 460. In an embodiment, the designated control device positions 460 may include the approach flaps position 466, the takeoff flaps position 468, or the landing flaps position 472. Movement of the edge control device 453 to a designated control device position 460 may enable operation of the slat control system 300.

Step 604 of the method may include positioning a leading edge device 150 of an aircraft wing 116 in a sealed position 182. For example, when the pilot moves the flap control lever 454 from the cruise position 462 to the approach flaps position 466, the trailing edge flaps 242 (FIG. 4) may move to an approach flaps setting 252 (FIG. 4) and the leading edge devices 150 (e.g., the inboard and outboard slats 154, 156) may move from the refracted position (FIG. 4) to the sealed position 182 (FIG. 4). Step 604 may be an optional step if the leading edge device 150 has previously been provided in a sealed position 182.

Optional step 606 of the method 600 may include inhibiting movement of the leading edge devices 150 to the gapped position 184 if the aircraft 100 is above the gap-inhibit radio altitude 514. The flight control computer 450 may continuously receive data input regarding the actual radio altitude 502 as may be measured by a radio altimeter (not shown). The flight control computer 450 may control the slat actuation system 200 to inhibit movement of the leading edge devices 150 to the gapped position 184 when the actual radio altitude 502 exceeds the gap-inhibit radio altitude 514. By inhibiting gapping of the leading edge devices 150 when the aircraft is on approach, noise as perceived on the ground may be reduced or minimized.

In step 608 of the method 600 the flight control computer 450 may determine whether a gap-command condition exists and may generate a gap command 512 if the actual angle of attack 504 exceeds the autogap threshold angle of attack 516 and/or if an actual radio altitude 502 of the aircraft 100 is below the gap-inhibit radio altitude 514. In some examples, for instance to improve stall performance of the aircraft 100, the flight control computer 450 may compare the actual angle of attack 504 of the wings 116 to an autogap threshold angle of attack 516 and generate a gap command, regardless of the whether the actual radio altitude 502 is above or below the gap-inhibit radio altitude 514.

According to some examples, the method 600 may include using the flight control computer 450 to generate a gap command 512 based on the gap-inhibit radio altitude 514 and the autogap threshold angle of attack 516. For example, the flight control computer 450 may compare the actual radio altitude 502 to the gap-inhibit radio altitude 514, and determine that a gap-command condition exists when the actual radio altitude 502 of the aircraft is lower than the gap-inhibit radio altitude 514 causing the flight control computer 450 to generate the gap command 512. The flight control computer 450 may continuously or periodically receive additional aircraft state data 500 such as aircraft gross weight 508, aircraft center of gravity 510, horizontal and vertical airspeed 506, and other aircraft state data 500 which may be processed by the flight control computer 450 in conjunction with the actual radio altitude 502 and/or actual angle of attack 504 to determine whether the gap-command condition continues to exists. As shown in step 610 in FIG. 18, the method 600 may further include automatically commanding the leading edge device 150 from a first position (e.g., a sealed position 182) to a second position (e.g., a gapped position 184) responsive, at least in part, to the gap command 512. For example, if the leading edge device 150 has previously been provided in a sealed position 182, the slat control system 300 may automatically command the leading edge device 150 to a gapped position 184 upon the generation of a gap command 512 by the flight control computer 450.

In some examples, step 610 may include automatically commanding, using an edge control system 452, a device actuation system 198 to extend one or more leading edge devices 150 (FIG. 5) from the sealed position 182 (FIG. 4) to the gapped position 184 (FIG. 5) when the edge control system 452 receives the gap command 512. For example, upon removal of a gap inhibit condition, e.g. when the actual radio altitude 502 is below the gap-inhibit radio altitude 514, the edge control system 452 may command the slat actuation system 200 to extend the leading edge devices 150 to the gapped position 184. When the aircraft is above the gap-inhibit radio altitude 514 and the actual angle of attack 504 falls below the autogap threshold angle of attack 516, the autogap command 512 may be removed causing the leading edge devices to move from the gapped position 184 to the sealed position 182.

A further optional step 612 of the method 600 may include moving an inboard leading edge device 144 independently of an outboard leading edge device 146. For example, step 614 of the method 600 may include automatically commanding, using the edge control system 452, the device actuation system 198 to extend and/or retract one or more inboard leading edge devices 144 (e.g., inboard slats 154) and one or more outboard leading edge devices 146 (e.g., outboard slats 156) independent of one another. In an embodiment, when the flight control computer 450 detects a gap-command condition such as when the actual angle of attack 504 of the wing 116 exceeds the autogap threshold angle of attack 516, the edge control system 452 may automatically command the slat actuation system 200 to extend the outboard slats 156 (FIG. 10) from the sealed position 182 to the gapped position 184 prior to extending the inboard slats 154 (FIG. 10) to the gapped position 184.

Independent movement or actuation of the inboard devices and outboard devices may be facilitated by VCTUs 302 operating in conjunction with the leading edge PDU 402. The central brake 414 of the leading edge PDU 402 may be applied to prevent rotation of the inboard torque tube 294 and actuation of the inboard slats 154. The VCTU electric motors 304 on the leading edges 118 of the wings 116 may be activated to cause rotation of the outboard torque tube 296 and extension of the outboard slats 156 from the sealed position 182 to the gapped position 184 while the inboard slats 154 are maintained in the sealed position 182. Once the outboard slats 156 are in the gapped position 184, the outboard brake 354 of the VCTU 302 may be applied and the central brake 414 of the leading edge PDU 402 may be released to allow for activation of the central motor 406 to rotate the inboard torque tube 294 causing extension of the inboard slats 154 from the sealed position 182 to the gapped position 184. By delaying the extension of the inboard slats 154 until the outboard slats reach the gapped position 184, actuation power requirements may be reduced or minimized, which may allow for a reduction in the size of the actuator components which may minimize the weight of the aircraft 100.

Optional step 614 of the method 600 of FIG. 18 may include using the flight control computer to continuously monitor the aircraft state data 500 450 to determine whether a gap-command condition continues to exist. In this regard, the flight control computer 450 may continuously receive input from a radio altimeter or other altitude measurement device indicating the actual radio altitude 502 of the aircraft 100. Actual angle of attack 504 of the wing 116 may be measured by an angle of attack indicator (not shown) and provided to the flight control computer 450. The flight control computer 450 may continuously compare the actual radio altitude 502 to the gap-inhibit radio altitude 514 and/or continuously compare the actual angle of attack 504 to the autogap threshold angle of attack 516 to determine whether the gap command 512 condition continues to exist.

Further optional step 616 of the method 600 of FIG. 18 may include automatically commanding, using the edge control system 452, the device actuation system 198 to retract one or more of the leading edge devices 150 from the gapped position 184 to the sealed position 182 when the gap command 512 condition ceases to exist. For example, upon determining that the actual angle of attack 504 is less than the autogap threshold angle of attack 516, the edge control system 452 may automatically command the slat actuation system 200 to retract the inboard slats 154 and/or the outboard slats 156 from the gapped position 184 to the sealed position 182. However, the slat control system 300 may be configured such that as long as the aircraft 100 is below the gap-inhibit radio altitude 514, the edge control system 452 may maintain the inboard and/or outboard slats 154, 156 in the gapped position 184 regardless of whether the actual angle of attack 504 falls below the autogap threshold angle of attack 516. In addition, the slat control system 300 may be configured such that as long as the actual angle of attack 504 exceeds the autogap threshold angle of attack 516, the inboard and/or outboard leading edge devices 150 144, 146 may be maintained in the gapped position 184 regardless of whether the aircraft 100 is above the gap-inhibit radio altitude 514.

Figure 19:
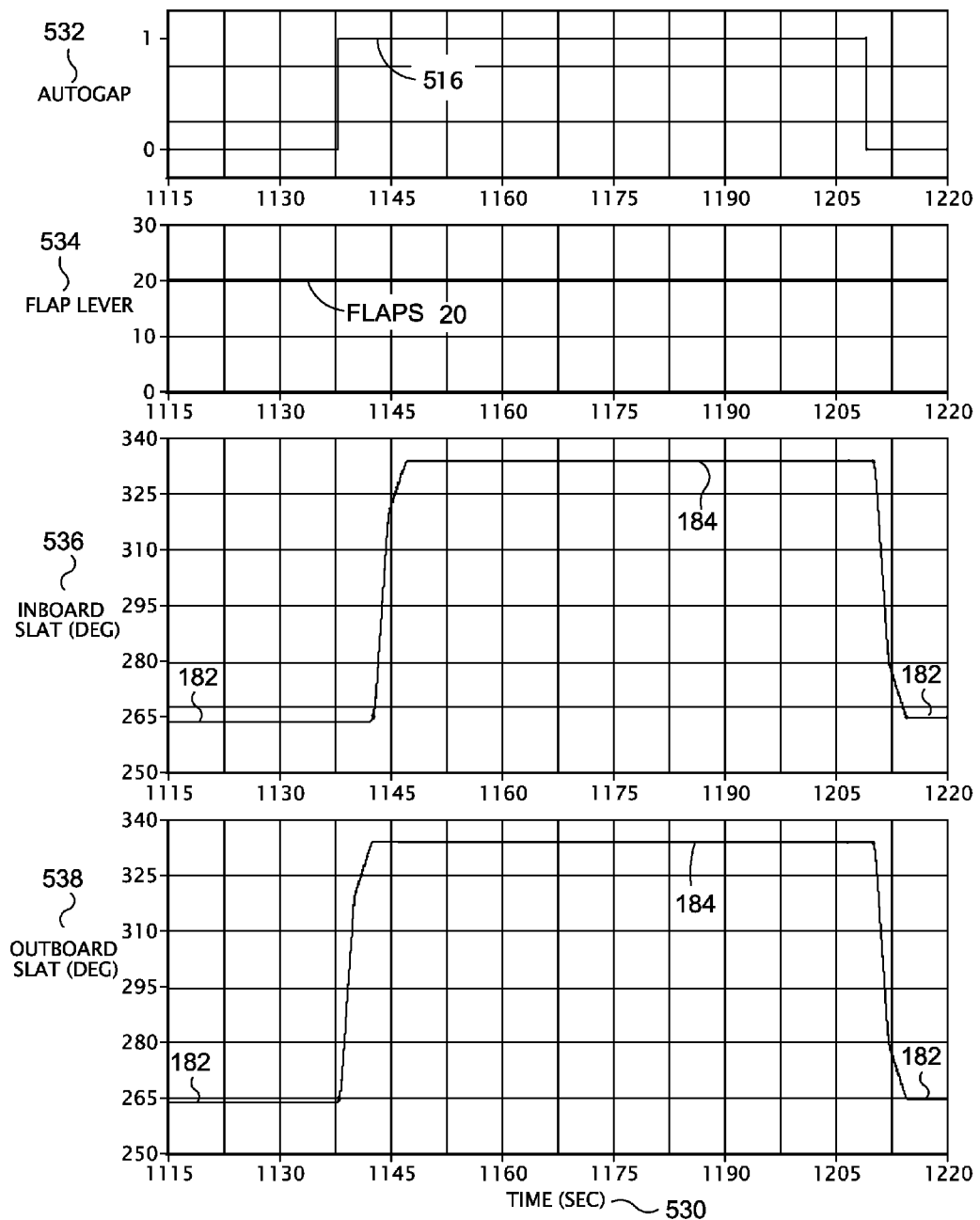
FIG. 19 shows several plots illustrating the functionality of a sealed-approach slat system requiring reduced power due to the differential (e.g., staggered timing) deployment of inboard and outboard slats.

FIG. 19 shows several graphs that illustrate a functionality of a slat control system 300 according to some examples herein, including a differential deployment of inboard leading edge devices 144 and outboard leading edge devices 146 such as during the approach phase of a flight. The uppermost graph of FIG. 19 illustrates changes in an AUTOGAP parameter as a function of time 530. The AUTOGAP parameter may indicate a state of an autogap functionality of the flight control system of aircraft 100. In FIG. 19, the AUTOGAP parameter is depicted as transitioning from a value of 0 or OFF to a value of 1 or ON, which may indicate that the slat control system 300 has been engaged or provided into an autogap mode 532. The slat control system may be configured to automatically engage (e.g., AUTOGAP toggles from 0 or OFF to 1 or ON) upon the detection of a gap-command condition by the flight control computer 450, for example if the actual angle of attack 504 of the aircraft 100 exceed the autogap threshold angle of attack 516. The second graph illustrates changes in the flap lever position over time 530. The graph of the flap lever position 534 illustrates that the flap lever remains in a Flaps 20 position which may correspond to an approach flaps position 466 (FIG. 6) or a takeoff flaps position 468 (e.g., TOGA) on the edge control system 452 of FIG. 6. As previously discussed, the approach flaps position, the takeoff flaps position, and/or other flap lever positions may be a designated control device position which enable automatic command of the leading edge devices according to the examples herein.

The two lowermost graphs of FIG. 19 show the inboard slat deflection angle 536 and outboard slat deflection angle 538 of the respective inboard and outboard slats 154, 156 plotted over time 530. The outboard slats 156 are initially independently extended from the sealed position 182 to the gapped position 184 after the generation of the gap command 512. The inboard slats 154 are initially retained in the sealed position 182 while the outboard slats 156 are driven from the sealed position 182 to the gapped position 184. Upon deployment of the outboard slats 156 to the gapped position 184, the inboard slats 154 may be driven from the sealed position 182 to the gapped position 184. The outboard slats 156 may be retained in the gapped position 184 while the inboard slats extend to the gapped position 184. The two lowermost graphs of FIG. 19 further illustrate a retraction of the inboard and outboard slats 154, 156, which may be performed in unison after the termination of the gap-command condition.

Figure 20:
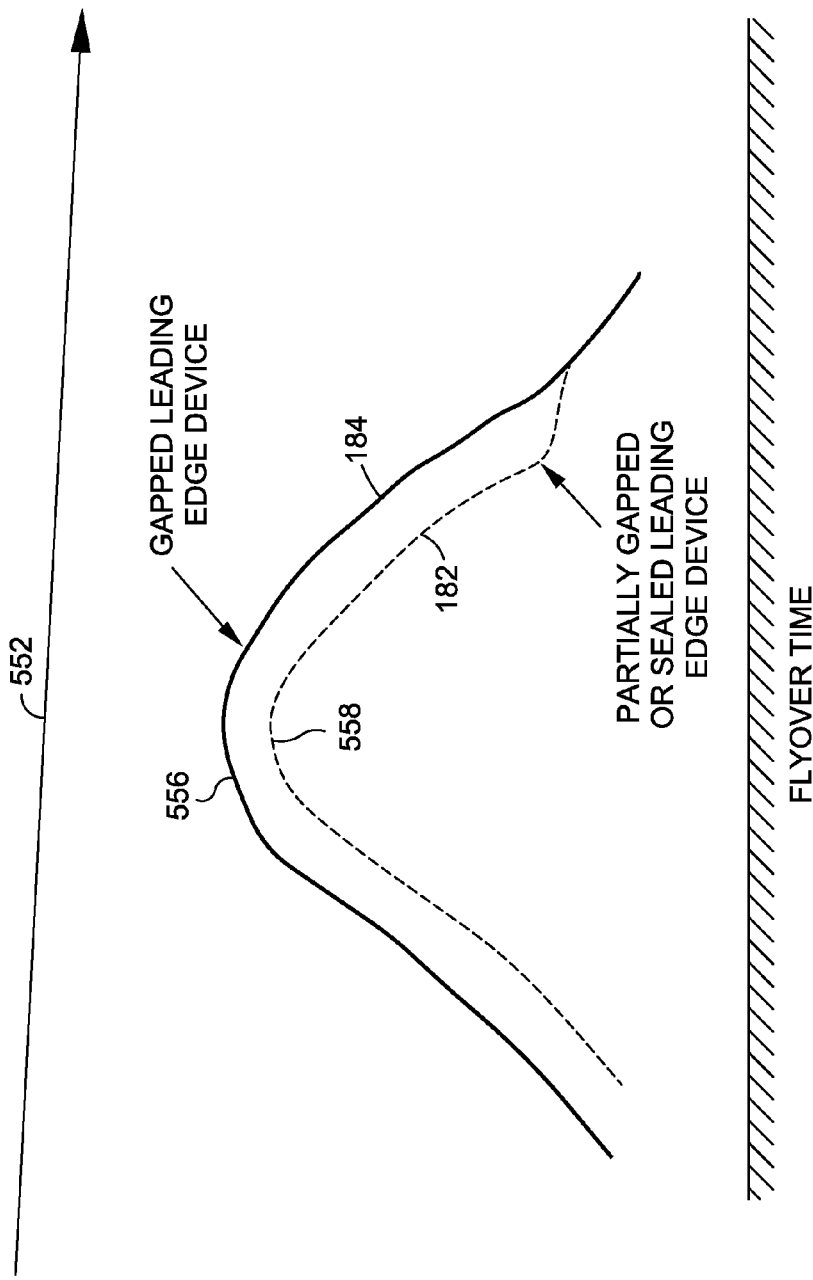
FIG. 20 is a plot of the noise time history of an aircraft on approach and illustrating a reduction in the perceived noise level generated by the aircraft with leading edge devices in a sealed position relative to the perceived noise level generated by the aircraft with the leading edge devices in a gapped position.

FIG. 20 is a graph of an example of noise time history of an aircraft 100 on approach descending on a 3-degree glide slope 552. The graph illustrates the perceived noise level generated by an aircraft 100 as a function of flyover time 550. The noise level is measured at a ground location underneath the glide slope 552. The solid line plots the perceived noise level 556 of an aircraft 100 with leading edge devices 150 in a gapped position 184. The dashed line plots the perceived noise level 558 of the same aircraft 100 with leading edge devices 150 in a partially gapped or sealed position 182. As can be seen, the noise performance of the aircraft 100 may be improved (e.g., noise is reduced) by the slat control system 300 of the present disclosure, e.g., by maintaining leading edge devices 150 in the sealed position 182 during approach.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A slat control system for an aircraft, comprising:
a flight control computer configured to generate a gap command in response to an occurrence of a gap-command condition;
an edge control system including an edge control device selectable into any one of a plurality of control device positions including at least one of an approach flaps position and a landing flaps position, the control device positions corresponding to settings for leading edge devices and trailing edge devices of an aircraft;
a device actuation system configured to move a leading edge device to the control device position selected using the edge control device, the leading edge device operatively coupled to a wing by an inboard torque tube or other mechanical linkage as part of the device actuation system;
the edge control system commanding the device actuation system to perform one of the following only when the edge control device is in one of the approach flaps position and the landing flaps position:
extend the leading edge device from a sealed position to a gapped position based upon a determination by the flight control computer that the aircraft has descended below a gap-inhibit radio altitude; and
retract the leading edge device from the gapped position to the sealed position based upon a determination by the flight control computer that the aircraft has climbed above the gap-inhibit radio altitude.

2. The slat control system of claim 1, wherein:
the flight control computer is configured to continuously monitor aircraft state data to determine whether the gap-command condition continues to exist.

3. The slat control system of claim 1, wherein:
a plurality of leading edge devices are coupled to a wing leading edge including an inboard leading edge device and an outboard leading edge device; and wherein the slat control system further comprise a device actuation system configured to actuate the inboard leading edge device and the outboard leading edge device independent of one another.

4. The slat control system of claim 3, wherein:
the edge control system is configured to automatically command the device actuation system to extend the outboard leading edge device from the sealed position to the gapped position prior to extending the inboard leading edge device to the gapped position.

5. The slat control system of claim 3, wherein:
the device actuation system includes a variable camber trim unit (VCTU) positioned between the inboard leading edge device and the outboard leading edge device; and
the VCTU actuating the outboard leading edge device independent of the inboard leading edge device.

6. A method of minimizing noise of an aircraft, comprising:
moving an edge control device to a designated control device position of a plurality of control device positions selectable using the edge control device, the designated control device position including at least one of an approach flaps position and a landing flaps position, the plurality of control device positions corresponding to settings for leading edge devices and trailing edge devices of an aircraft, the leading edge devices operatively coupled to a wing by an inboard torque tube or other mechanical linkage as part of a device actuation system;
generating a gap command only if the edge control device is in one of the approach flaps position and the landing flaps position and the aircraft is on approach and descends below a gap-inhibit radio altitude;
automatically commanding at least one leading edge device from a sealed position to a gapped position based upon a determination by a flight control computer that the aircraft has descended below a gap-inhibit radio altitude; and
automatically commanding the at least one leading edge device from the gapped position to the sealed position based upon a determination by the flight control computer that the aircraft has climbed above the gap-inhibit radio altitude.

7. The method of claim 6, further comprising:
continuously monitoring aircraft state data to determine a termination of a gap-command condition.

8. The method of claim 6, wherein the step of extending the leading edge device includes:
automatically commanding an inboard leading edge device independently of an outboard leading edge device.

9. The method of claim 8, wherein the step of automatically commanding the inboard leading edge device independently of the outboard leading edge device includes:
automatically commanding extension of the outboard leading edge device from the sealed position to the gapped position prior to extending the inboard leading edge device to the gapped position.

10. The method of claim 6, wherein the aircraft further comprises a variable camber trim unit (VCTU) including:
an inboard shaft coupled to an inboard leading edge device and an outboard shaft coupled to an outboard leading edge device; and
wherein the step of automatically commanding the inboard leading edge device independently of the outboard leading edge device includes rotating the inboard shaft independently of the inboard shaft.

11. A method of minimizing approach noise of an aircraft, comprising:
   moving an edge control device of an edge control system to a designated control device position of a plurality of control device positions selectable using the edge control device, the designated control device position including one of an approach flaps position and a landing flaps position, the plurality of control device positions corresponding to settings for leading edge devices and trailing edge devices of an aircraft, the leading edge devices operatively coupled to a wing by an inboard torque tube or other mechanical linkage as part of a device actuation system;
   moving an inboard leading edge device and an outboard leading edge device from a retracted position to a sealed position in response to moving the edge control device into one of the approach flaps position and the landing flaps position;
   generating, using a flight control computer, a gap command only if the edge control device is in one of the approach flaps position and the landing flaps position and the aircraft is on approach and descends below a gap-inhibit radio altitude;
   automatically commanding, using the edge control system, the device actuation system to extend the outboard leading edge device from the sealed position to a gapped position based upon a determination by the flight control computer that the aircraft has descended below a gap-inhibit radio altitude while retaining the inboard leading edge device in the sealed position upon generation of the gap command; and
   automatically commanding the outboard leading edge device from the gapped position to the sealed position based upon a determination by the flight control computer that the aircraft has climbed above the gap-inhibit radio altitude.

12. The slat control system of claim 1, wherein:
   the leading edge device is a Krueger flap.

13. The slat control system of claim 1, wherein:
   the leading edge device is a slat.

14. The slat control system of claim 1, wherein:
   the edge control device is a flap control lever movable along a forward-and-aft direction.

15. The slat control system of claim 1, wherein:
   the edge control device is one of the following: a pushbutton device, a rotary dial, an electronic controller.

16. The slat control system of claim 1, wherein the gap-inhibit radio altitude is provided to the flight control computer via at least one of the following:
   the gap-inhibit radio altitude is preprogrammed into the flight control computer as a fixed value;
   the gap-inhibit radio altitude is manually entered into the flight control computer before or during a flight.

17. The method of claim 6, wherein:
   the leading edge device is a Krueger flap.

18. The method of claim 6, wherein:
   the leading edge device is a slat.

19. The method of claim 6, wherein:
   the edge control device is one of the following: a flap control lever, a pushbutton device, a rotary dial, an electronic controller.

20. The method of claim 6, further including one of the following:
   preprogramming the gap-inhibit radio altitude into the flight control computer as a fixed value;
   manually entering the gap-inhibit radio altitude into the flight control computer before or during a flight.

* * * * *